United States Patent
Lin et al.

(10) Patent No.: US 12,547,282 B2
(45) Date of Patent: Feb. 10, 2026

(54) DETECTION METHOD AND TOUCH AND DISPLAY DRIVER INTEGRATION THEREOF

(71) Applicant: NOVATEK Microelectronics Corp., Hsin-Chu (TW)

(72) Inventors: Chung-Cher Lin, Hsinchu County (TW); Yun-Hsiang Yeh, Hsinchu (TW); Ta-Keng Weng, Taichung (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/928,163

(22) Filed: Oct. 27, 2024

(65) Prior Publication Data
US 2025/0271971 A1     Aug. 28, 2025

(30) Foreign Application Priority Data
Feb. 27, 2024 (TW) .................. 113106907

(51) Int. Cl.
*G06F 3/044* (2006.01)
*G06F 3/041* (2006.01)

(52) U.S. Cl.
CPC .......... *G06F 3/0442* (2019.05); *G06F 3/0412* (2013.01); *G06F 3/04162* (2019.05); *G06F 3/04186* (2019.05); *G06F 2203/04105* (2013.01)

(58) Field of Classification Search
None
See application file for complete search history.

(56) References Cited

U.S. PATENT DOCUMENTS

2012/0327042 A1   12/2012   Harley
2013/0169601 A1    7/2013   Mo

FOREIGN PATENT DOCUMENTS

| CN | 114327099 A | 4/2022 | |
|----|-------------|--------|-|
| CN | 116736995 A | 9/2023 | |
| TW | 202143015 A | 11/2021 | |
| WO | WO-2018054032 A1 * | 3/2018 | ......... G06F 3/03545 |

* cited by examiner

*Primary Examiner* — Brian M Butcher
(74) *Attorney, Agent, or Firm* — Winston Hsu

(57) ABSTRACT

A detection method for a touch and display driver integration circuit of a touch device comprises determining whether an active stylus contacts the touch device according to information related to strength of a sensing signal, which is corresponding to the active stylus, and providing the sensing signal or position information of the active stylus after determining the active stylus being in contact with the touch device, thereby improving user experience.

20 Claims, 13 Drawing Sheets

DETECTION METHOD AND TOUCH AND DISPLAY DRIVER INTEGRATION THEREOF

BACKGROUND OF THE INVENTION

1. Field of the Invention

The present invention relates to a detection method and a touch and display driver integration (TDDI) circuit thereof, and more particularly, to a detection method and a TDDI circuit thereof with higher adaptability or accuracy for an active stylus.

2. Description of the Prior Art

An active stylus may be used as an input device for an electronic device that comprises a touch panel. However, in the existing technology, the active stylus cannot determine whether it is currently pressed on the touch panel. Besides, it is difficult for the touch panel to determine whether the active stylus is lightly touching its surface. These affect the accuracy of the operation between the active stylus and the touch panel. Therefore, there is still room for improvement in determining whether the active stylus is in contact with the touch panel.

SUMMARY OF THE INVENTION

Therefore, the present invention primarily provides a detection method and a TDDI circuit thereof, which may improve user experience and adapt to different active styluses or changes in the thickness of a touch panel.

An embodiment of the present application discloses a detection method, for a touch and display driver integration circuit of a touch device, comprising determining whether an active stylus contacts the touch device according to information related to strength of a sensing signal, which is corresponding to the active stylus; and providing the sensing signal or position information of the active stylus after determining that the active stylus is in contact with the touch device.

Another embodiment of the present application discloses a touch and display driver integration (TDDI) circuit, which is or is to be disposed in a touch device, comprising a determining unit, to determine whether an active stylus contacts the touch device according to information related to strength of a sensing signal, which is corresponding to the active stylus; and an output terminal, to provide the sensing signal or position information of the active stylus after determining that the active stylus is in contact with the touch device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
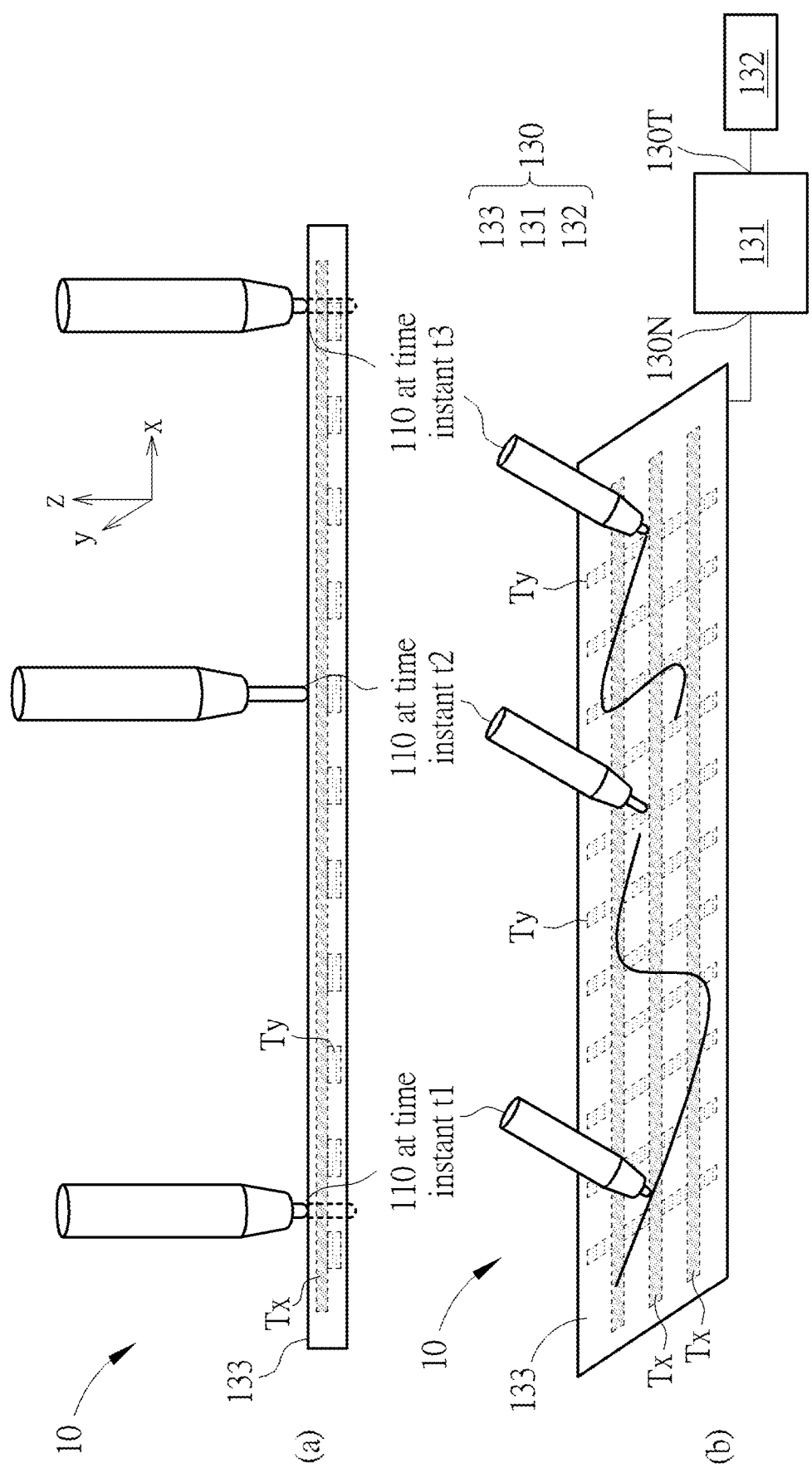
FIG. 1 (a) and (b) are a side view and a perspective view schematic diagrams of a sensing system according to an embodiment of the present invention, respectively.

FIG. 1 (a) and (b) are a side view and a perspective view schematic diagrams of a sensing system 10 according to an embodiment of the present invention, respectively. The sensing system 10 may comprise an active stylus 110 and a touch device 130. The touch device 130 may comprise a touch and display driver integration (TDDI) circuit 131, an application processor 132, and a touch panel 133, which comprises sensor electrodes Tx and Ty. The TDDI circuit 131 may comprise an input terminal 130N and an output terminal 130T.

To determine whether the active stylus 110 contacts the touch device 130, the active stylus 110 needs to be equipped with a pressure sensor (not shown), which enables the active stylus 110 to determine whether it is currently in pressed state. For example, at a time instant t1, when the active stylus 110 is pressed against the touch device 130, a pressure sensing value, measured by the pressure sensor of the active stylus 110, may be provided to the TDDI circuit 131 using a pressure sensing signal. Besides, according to the pressure sensing signal (e.g., PSS), the TDDI circuit 131 may determine whether the active stylus 110 is in contact with an object. (For example, if the pressure sensing value of the active stylus 110 is greater than or equal to a pressure threshold, it indicates that the active stylus 110 has contacted the object.) After sensor electrode(s) Ty or Tx corresponding to the active stylus 110 detects a sensing signal, the strength of which may be strong enough or weak, the TDDI circuit 131 (or its output terminal 130T) reports (i.e., point-reports) to the application processor 132. According to the position information of the active stylus 110 and the stroke size indicated by the pressure sensing value, the touch panel 133 may display the writing trajectory of the active stylus 110 (e.g., the bold solid curve shown in FIG. 1) or the corresponding operation result.

However, at a time instant t2, the active stylus 110 may only lightly touch or gently slide across the touch device 130. (That is, the active stylus 110 contacts the touch device 130 but with little or no relative force). In this case, the pressure sensing value of the pressure sensing signal, provided by the active stylus 110 to the TDDI circuit 131, may be less than the pressure threshold. In other words, the pressure sensing value may reflect that the active stylus 110 is not in contact with the touch device 130. When sensor electrode(s) Ty or Tx corresponding to the active stylus 110 detects a sensing signal, the strength of which may be strong enough or weak, the insufficient pressure sensing value will prevent the TDDI circuit 131 from reporting (i.e., point-reporting) to the application processor 132. Therefore, the active stylus 110 cannot perform click or drawing operations smoothly on the touch device 130, leading to disconnection/discontinuity issues.

To address the issue of the inability to accurately determine whether the active stylus is in contact with the touch device due to an insufficient pressure sensing value or the absence of a pressure sensor, it is possible to determine whether the active stylus touches the touch device based on the sensing signal corresponding to the active stylus.

Figure 2:
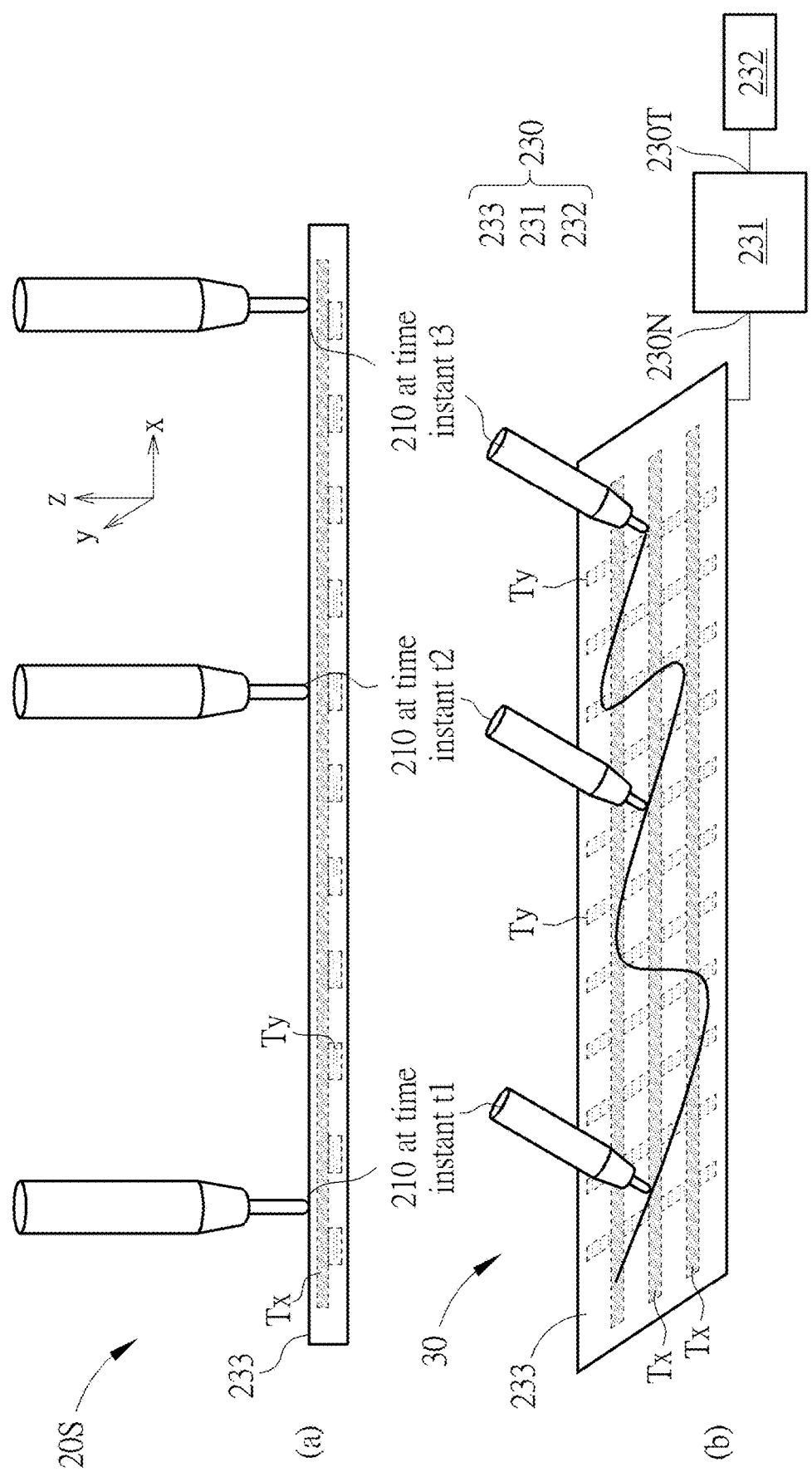
FIG. 2 (a) and (b) are a side view and a perspective view schematic diagrams of a sensing system according to an embodiment of the present invention, respectively.

For example, FIG. 2 (a) and (b) are a side view and a perspective view schematic diagrams of a sensing system 20S according to an embodiment of the present invention, respectively. The sensing system 20S may comprise an active stylus 210 and a touch device 230. The touch device 230 may comprise a TDDI circuit 231, an application processor 232, and a touch panel 233. The TDDI circuit 231 may comprise an input terminal 230N and an output terminal 230T.

When the active stylus 210 does not comprise a pressure sensor, the TDDI circuit 231 cannot receive any pressure sensing signal, related pressure sensing value(s) of the active stylus 210, and therefore cannot determine whether the active stylus 210 is in contact with the touch device 230. As shown in FIG. 2, based on the strength of a sensing signal detected by the sensor electrode(s) Ty or Tx corresponding to the active stylus 210, the TDDI circuit 231 may determine whether the active stylus 210 contacts the touch device 230. For example, the TDDI circuit 231 may determine whether the active stylus 210 contacts the touch device 230, by comparing whether the strength of the sensing signal corresponding to the active stylus 210 reaches a strength threshold. Once determining that the active stylus 210 contacts the touch device 230, the TDDI circuit 231 may point-report to the application processor 232. According to the position information of the active stylus 210, the touch panel 233 may display the writing trajectory of the active stylus 210 (e.g., the bold solid curve shown in FIG. 2) or the corresponding operation result.

In another implementation, the active stylus 210 comprises a pressure sensor. However, it is possible that the active stylus 210 only lightly touches the touch device 230, so the pressure sensor may not detect any pressure or may sense a pressure value that is too small. As a result, a pressure sensing signal (e.g., PSS) received by the TDDI circuit 231 may indicate that a pressure sensing value is below a pressure threshold, making it difficult to correctly determine whether contact has occurred. As shown in FIG. 2, based on the strength of the sensing signal detected by the sensor electrode(s) Ty or Tx corresponding to the active stylus 210, the TDDI circuit 231 may assist in determining whether the active stylus 210 contacts the touch device 230.

For example, when the TDDI circuit 231 determines that the pressure sensing value corresponding to the pressure sensing signal is less than the pressure threshold, and the strength of the sensing signal corresponding to the active stylus 210 is less than the strength threshold, the TDDI circuit 231 determines/concludes that the active stylus 210 isn't in contact with the touch device 230. When the TDDI circuit 231 determines that the pressure sensing value corresponding to the pressure sensing signal is less than the pressure threshold, but the strength of the sensing signal corresponding to the active stylus 210 is greater than or equal to the strength threshold, the TDDI circuit 231 determines/concludes that the active stylus 210 contacts the touch device 230. When the TDDI circuit 231 determines that the pressure sensing value corresponding to the pressure sensing signal is greater than or equal to the pressure threshold, the TDDI circuit 231 determines/concludes that the active stylus 210 contacts the touch device 230, and the TDDI circuit 231, at this time, may skip comparing the strength of the sensing signal corresponding to the active stylus 210 with the strength threshold. After determining the active stylus 210 contacts the touch device 230 based on the pressure sensing value detected by the pressure sensor or the sensing signal detected by the sensor electrode(s) Ty or Tx, the TDDI circuit 231 may point-report to the application processor 232. According to the position information of the active stylus 210, the touch panel 233 may display the writing trajectory of the active stylus 210 (e.g., the bold solid curve shown in FIG. 2) or the corresponding operation result.

In another embodiment, the active stylus 210 contacts the touch device 230, but the pressure sensing signal detected by the pressure sensor in the active stylus 210 is not greater than the pressure threshold. As a result, a processor in the active stylus 210 determines that the active stylus 210 does not touch the touch device 230 at this time, and the active stylus 210 does not send a corresponding touch signal to the touch device 230. However, at this time, the TDDI circuit 231 in the touch device 230 determines that the strength of the sensing signal corresponding to the active stylus 210 is greater than or equal to the strength threshold; therefore, the TDDI circuit 231 determines that the active stylus 210 has contacted the touch device 230, and notify the processor in the active stylus 210 using a downlink signal to adjust the pressure threshold.

In another embodiment, the active stylus 210 neither process the pressure sensing signal detected by the sensor nor determine whether the active stylus 210 contacts the touch device 230. Instead, the active stylus 210 simply transmits the detected pressure sensing signal to the touch device 230, and the TDDI circuit 231 determines whether the active stylus 210 touches the touch device 230. When the TDDI circuit 231 determines that the pressure sensing signal is not greater than the pressure threshold and the strength of the sensing signal corresponding to the active stylus 210 is greater than or equal to the strength threshold, the TDDI circuit 231 not only determines/concludes that the active stylus 210 contacts the control device 230 but also adjust the pressure threshold according to the received pressure sensing signal.

In another embodiment, the active stylus 210 comprises a pressure sensor. However, when the pressure sensor does not detect a pressure sensing signal but the TDDI circuit 231 determines that the strength of the sensing signal corresponding to the active stylus 210 is greater than or equal to the strength threshold, the touch device 230 determines that the active stylus 210 performs hover touch. At this time, according to the movement of the active stylus 210, the touch device 230 may perform touch control or display the trajectory of the active stylus 210. However, the trajectory of the active stylus 210 displayed on the touch device 230 is fixed/consistent, without any variation in thickness or depth, at this time.

In other words, the touch device 230 may assist an active stylus (e.g., 110 or 210) equipped with a pressure sensor to prevent disconnection/discontinuity when the active stylus slides lightly without pressure sensibility. Furthermore, the touch device 230 also allows smooth sliding and writing on the touch device 230 when an active stylus without a pressure sensor (e.g., 210) or an active stylus without activating its pressure sensor (e.g., 110 or 210) is used.

In one embodiment, the application processor 232 may transmit image source to the TDDI circuit 231, and the TDDI circuit 231 may display and point-report to the application processor 232. In one embodiment, "point reporting" means that the TDDI circuit 231 receives a sensing signal detected by the sensor electrode(s) (e.g., Tx, Ty) corresponding to the active stylus 110, and reports position information (e.g., the x and y coordinates of the active stylus 110 or which sensor electrode(s) Tx or Ty the active stylus 110 is close to), which is converted from the sensing signal, to the application processor 232. Alternatively, "point reporting" means that the TDDI circuit 231 only transmits the sensing signal to the application processor 232, which performs operations to find out the position information of the touch.

It is worth noting that, as shown in FIG. 2, at time instants t1 to t3, the height of the active stylus 210 relative to the touch device 230 remains the same, but the relative relationship between the active stylus 210 and the sensor electrode(s) Ty varies. For example, at the time instant t1, the tip of the active stylus 210 is outside a sensor electrode Ty. At the time instant t2, the tip of the active stylus 210 is at the center of another sensor electrode Ty. At the time instant t3, the tip of the active stylus 210 is near the edge of still another sensor electrode Ty.

In one embodiment, different relative relationship between the active stylus (e.g., 110 or 210) and the sensor electrode(s) Ty or Tx (e.g., different x and y coordinates) may affect the sensing signal, which is detected by the sensor electrode(s) Ty or Tx corresponding to the active stylus, thereby influencing the determined result of whether the active stylus is in contact with the touch device 230. In particular, when the tip of the active stylus is smaller than the width of a sensor electrode Ty or Tx, the influence of the relative relationship between the active stylus and the sensor electrode Ty or Tx is more significant.

Therefore, in one embodiment, the sensing signal corresponding to the active stylus may be converted/normalized, such that signal levels, which are converted from sensing signals for the active stylus at the same height (i.e., the same z coordinate) but at different positions (i.e., different x and y coordinates), fall within a certain range (e.g., between 95% and 105% of a threshold value). Based on whether the signal level converted from any given sensing signal falls between 95% and 105% of the threshold value, the touch device 230 may determine whether the active stylus is at the height (or the z coordinate) or whether the active stylus is in contact with the touch device, afterwards.

In another embodiment, the threshold value may be defined or set for signal levels, which undergo conversion/normalization for the sensing signals corresponding to the active stylus at the same height (i.e., the same z coordinate) but at different positions (i.e., different x and y coordinates), so as to represent that height (or the z coordinate). Based on whether the signal level converted from any given sensing signal falls between 95% and 105% of the threshold value, the touch device 230 may determine whether the active stylus is at the height (or the z coordinate) or whether the active stylus is in contact with the touch device, afterwards. For example, the TDDI circuit (e.g., 231) may obtain the sensing signals for the active stylus at the same height but at different positions, set the threshold value corresponding to the height (after calculation), and update or store the threshold value in a height lookup table. In this way, the threshold value is used in subsequent detection to determine whether the active stylus contacts the touch device.

Figure 3:
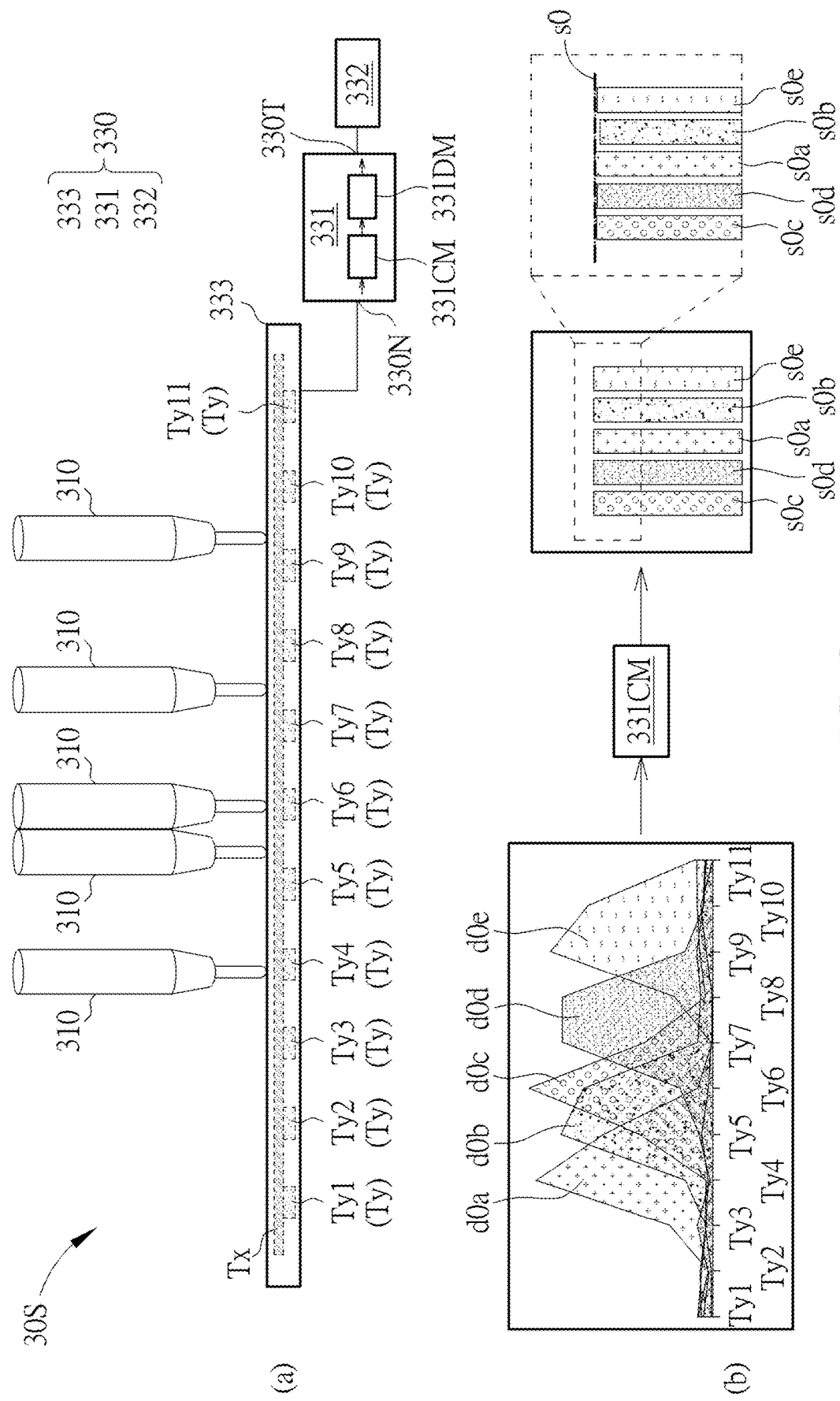
FIG. 3 is a schematic diagram of a sensing system according to an embodiment of the present invention.

For example, FIG. 3 is a schematic diagram of a sensing system 30S according to an embodiment of the present invention. As shown in FIG. 3 (a), a touch device 330 of the sensing system 30S may comprise a TDDI circuit 331, an application processor 332, and a touch panel 333, which comprises sensor electrodes Tx and Ty (e.g., Ty1 to Ty11). The TDDI circuit 331 may comprise an input terminal 330N, an output terminal 330T, a converting unit 331CM, and a determining unit 331DM. As shown in FIG. 3 (b), the TDDI circuit 331 may convert/normalize the sensing signals, which are measured for the active stylus 210 with the same height but at different positions, into signal levels, which fall within a certain range. The TDDI circuit 331 may compare these signal levels with a threshold value to determine that the active stylus 210 with the same height but at different positions shown in FIG. 3 (a) are all in contact with the touch device 330.

Figure 4:
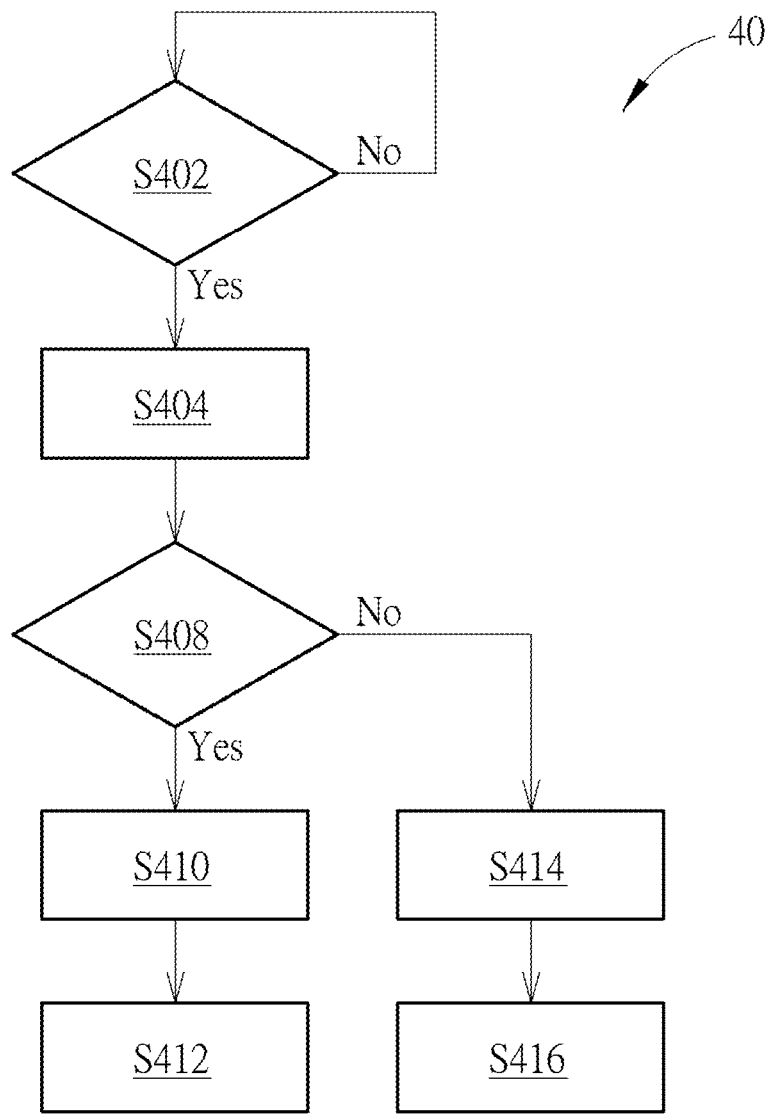
FIG. 4 is a flowchart of a detection method according to an embodiment of the present invention.

Correspondingly, FIG. 4 is a flowchart of a detection method 40 according to an embodiment of the present invention. The detection method 40, which may be compiled into a program code and used in a touch device (e.g., 330), may comprise the following steps:

Step S402: The sensor electrode(s) (e.g., Ty or Tx) detect(s) sensing signal(s) (which may serve as downlink signal(s)). If the sensor electrode(s) detects a sensing signal corresponding to an active stylus (e.g., 310), proceed to step S404; otherwise, repeat step S402.

Step S404: A TDDI circuit (e.g., 331) converts the strength of the sensing signal into a signal level.

Step S408: According to the signal level corresponding to the active stylus, the TDDI circuit determines whether the active stylus is in contact with the touch device. If yes, proceed to step S410; otherwise, proceed to step S414.

Step S410: Based on the determined result that the active stylus contacts the touch device, the TDDI circuit or the application processor (e.g., 332) provides position information of the active stylus.

Step S412: The touch panel (e.g., 333) displays an image for the active stylus operation corresponding to the position information.

Step S414: Based on the determined result that the active stylus is not in contact with the touch device, the TDDI circuit or the application processor does not provide the position information of the active stylus.

Step S416: The touch panel displays an image unrelated to the operation of the active stylus.

Specifically, please refer to FIGS. 3 and 4. As shown in FIG. 3 (a), the active stylus 310 is located at different positions at different time instants, but in each time instant, the active stylus 310 is in contact with the touch device 330.

Based on the strength of the sensing signal detected by the sensor electrode(s) Ty or Tx in Step S402, the TDDI circuit 331 may obtain energy distribution data of the sensing signal relative to the sensor electrode(s) Ty or Tx in step S404. For example, the TDDI circuit 331 (e.g., a two-dimensional-to-one-dimensional (2D-to-1D) unit of the TDDI circuit 331) may convert two-dimensional strength data of the sensing signal detected by the sensor electrode(s) Tx or Ty1-Ty11 into one-dimensional energy distribution data (e.g., d0a to d0e) relative to the sensor electrode(s) Ty1-Ty11. For example, the two-dimensional strength data (e.g., a matrix) for the sensor electrode Ty1 but for different sensor electrodes Tx may be added up to a value/sum. By the same token, the two-dimensional strength data (e.g., a matrix) is sequentially added up one by one with respect to the sensor electrodes Ty1-Ty11 to form the one-dimensional energy distribution data (e.g., a vector). As shown in FIG. 3 (b), if the tip of the active stylus 310 is located at the center of the sensor electrode Ty6, the peak value of the energy distribution data d0c is higher. If the tip of the active stylus 310 is located between the sensor electrodes Ty7 and Ty8, the peak value of the energy distribution data d0d is smaller. In other words, the active stylus 310 at the same height but at different positions corresponds to different energy distributions or strength distributions.

Next, as shown in FIG. 3 (b), the converting unit 331CM may convert the energy distribution data (e.g., d0a to d0e) into signal level(s) in step S404. For example, the converting unit 331CM may convert one-dimensional energy distribution data (e.g., d0a) into a value (e.g., a signal level). For example, the different energy distribution data d0a-d0e, which are corresponding to the active stylus 310 at the same height but at different positions, may be converted/normalized by the converting unit 331CM to generate signal levels s0a to s0e, respectively. The signal levels s0a-s0e may fall within a certain range and are very close to each other; for example, the signal levels s0a-s0e may be close to a threshold value s0. In one embodiment, the signal levels s0a-s0e may range between 95% and 105% of the threshold value s0.

Next, the determining unit 331DM may compare the signal level (e.g., s0a) corresponding to the active stylus 310 with the threshold value s0, in step S408, to determine whether the active stylus 310 contacts the touch device 330. For example, based on the signal level (s0a), which is corresponding to the active stylus 310, falling between 95% and 105% of the threshold value s0, the TDDI circuit 331 may determine that the active stylus 310 is in contact with the touch device 330. Then, the TDDI circuit 331 may, in Step S410, point-report to the application processor 332, such that the position information or the sensing signal is transmitted to the application processor 232. In step S412, according to the position information of the active stylus 310, the touch panel 333 may display the writing trajectory of the active stylus 310 or the corresponding operation result.

Figure 5:
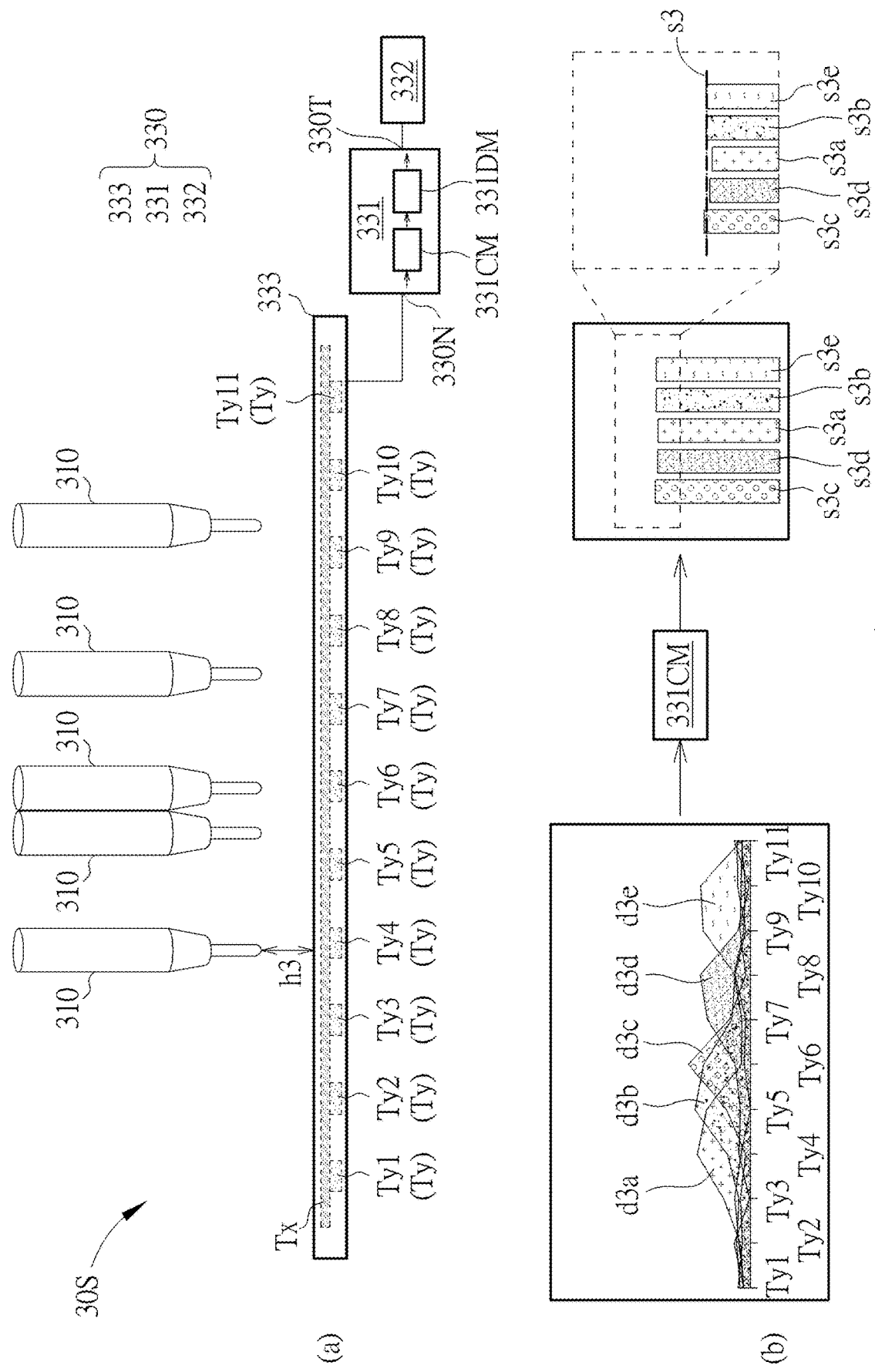
FIG. 5 and FIG. 6 are schematic diagrams of the active stylus shown in FIG. 3 at different heights relative to the touch device 330.

Correspondingly, please refer to FIGS. 4 and 5. FIG. 5 is a schematic diagram of the active stylus 310 shown in FIG. 3 at another height h3 relative to the touch device 330. As shown in FIG. 5 (a), at different time instants, the active stylus 310 is at different positions but positioned at the height h3 relative to the touch device 330.

Specifically, based on the strength of the sensing signals detected by the sensor electrode(s) Ty or Tx in step S402, the TDDI circuit 331 may obtain energy distribution data (e.g., d3a-d3e) of the sensing signal(s) relative to the sensor electrode(s) Ty or Tx (e.g., in step S404). Since the active stylus 310 in FIG. 5 (a) is at the height h3 away from the touch device 330, and the active stylus 310 shown in FIG. 3 (a) is in contact with the touch device 330, the peak values of the energy distribution data d0a-d0e, as shown in FIG. 3 (b), are higher than those of the energy distribution data d3a-d3e shown in FIG. 5 (b).

Then, as shown in FIG. 5 (b), the converting unit 331CM may convert the energy distribution data (e.g., d3a-d3e) into signal level(s) in step S404. For example, the different energy distribution data d3a-d3e, which are corresponding to the active stylus 310 at the same height h3 but at different positions, may be converted/normalized by the converting unit 331CM to generate signal levels s3a to s3e, respectively. The signal levels s3a-s3e may fall, for example, between 95% and 105% of a threshold value s3.

Then, the determining unit 331DM may compare the signal level (e.g., s3e) corresponding to the active stylus 310 with the threshold value s0 in step S408. Based on the signal level (s3e), which is corresponding to the active stylus 310, is not between 95% and 105% of the threshold value s0, the determining unit 331DM determines that the active stylus 310 is not in contact with the touch device 330. Therefore, in step S414, the TDDI circuit 331 does not point-report to the application processor 332. Correspondingly, in step S416, the touch device 330 does not display any image according to the operation of the active stylus 310 corresponding to this position information. In other words, the writing trajectory or the corresponding operation of the active stylus 310 will not appear on the touch panel 333 to avoid miswriting, unintentional writing (referred to as ink leaking), or accidental activation.

Figure 6:
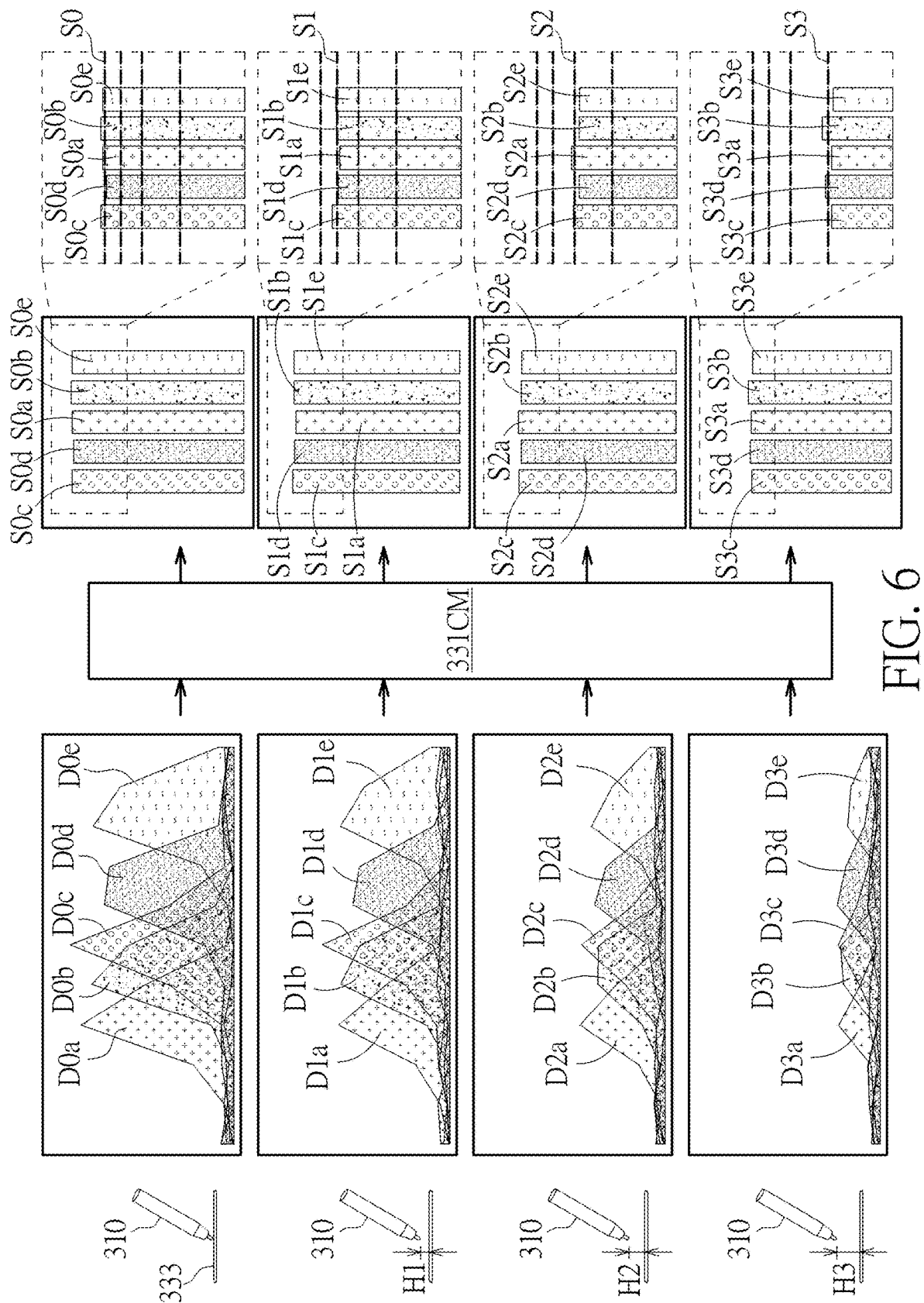

Furthermore, FIG. 6 is a schematic diagram of the active stylus 310 shown in FIG. 3 at different heights relative to the touch device 330. As shown in FIG. 6, the active stylus 310 may be located at different positions (e.g., different x, y coordinates) and different heights H0 to H3 at different time instants. The converting unit 331CM may convert energy distribution data (e.g., one of the energy distribution data D0a-D0e, D1a-D1e, D2a-D2e, and D3a-D3e) into a signal level. Signal levels (e.g., S0a-S0e, S1a-S1e, S2a-S2e, or S3a-S3e) corresponding to the same height (e.g., H0, H1, H2, or H3) may fall within a certain range, for example, between 95% and 105% of a threshold value (e.g., S0, S1, S2, or S3). Signal levels corresponding to different heights, however, fall into different ranges.

In one embodiment, the energy distribution data (e.g., d0a-d0e) in FIG. 3 (b) corresponds to sensing signals for the active stylus 310 at the same height but at different positions. Based on the two-dimensional strength data or the one-dimensional energy distribution data (e.g., d0a-d0e) of the sensing signals detected by the sensor electrodes Tx or Ty1-Ty11, the TDDI circuit 331 may determine whether the active stylus 310 is pressed down hard on the touch panel 333 or whether the active stylus 310 is tilted relative to the touch panel 333. A tilt of the active stylus 310 relative to the touch panel 333 may indicate a larger stroke size: for example, the active stylus 310 in calligraphy mode simulating the effect of a brush. In other words, the TDDI circuit 331 may determine the stroke size based on the strength or change of the sensing signal, and may adjust/decide the stroke size displayed on the touch panel 333 based on the change of the sensing signal. According to the position information or stroke size of the active stylus 310, the touch panel 333 may display the writing trajectory of the active stylus 310 (e.g., the bold solid curve shown in FIG. 2) or the corresponding operation result.

In one embodiment, when the active stylus 310 comprises a pressure sensor, the TDDI circuit 331 may determine the stroke size based on the strength or change of the pressure sensing signal, or may assist in determining the stroke size based on the strength or change of the sensing signal. Alternatively, the application processor 332 may determine the stroke size based on data about the pressure sensing value, which is provided by the pressure sensor, or may assist in determining the stroke size based on the strength or change of the sensing signal. According to the position information or stroke size of the active stylus 310, the touch panel 333 may display the writing trajectory of the active stylus 310 (e.g., the bold solid curve shown in FIG. 2) or the corresponding operation result.

In one embodiment, when the active stylus 310 comprises a pressure sensor, the pressure sensing value detected by the pressure sensor may be transmitted to the TDDI circuit 331 using a pressure sensing signal (which may serves as a downlink signal) or wirelessly transmitted to the application processor 332 (e.g., via Bluetooth). In other words, the magnitude of the pressure (e.g., pressure sensing value) may be determined by the TDDI circuit 331 or the application processor 332.

From another aspect, the converting unit 331CM in FIGS. 3-6 may eliminate differences in position (e.g., different x, y coordinates), and extract a stable signal level (e.g., S0a), which facilitate meaningful comparison, from the measured strength of the sensing signal or the energy distribution data (e.g., D0a) correspondingly. Consequently, the TDDI circuit 331 can determine whether the active stylus 310 contacts the touch device 330. A signal level (e.g. S0a) substantially implies or maps to height (e.g., a z coordinate).

Figure 7:
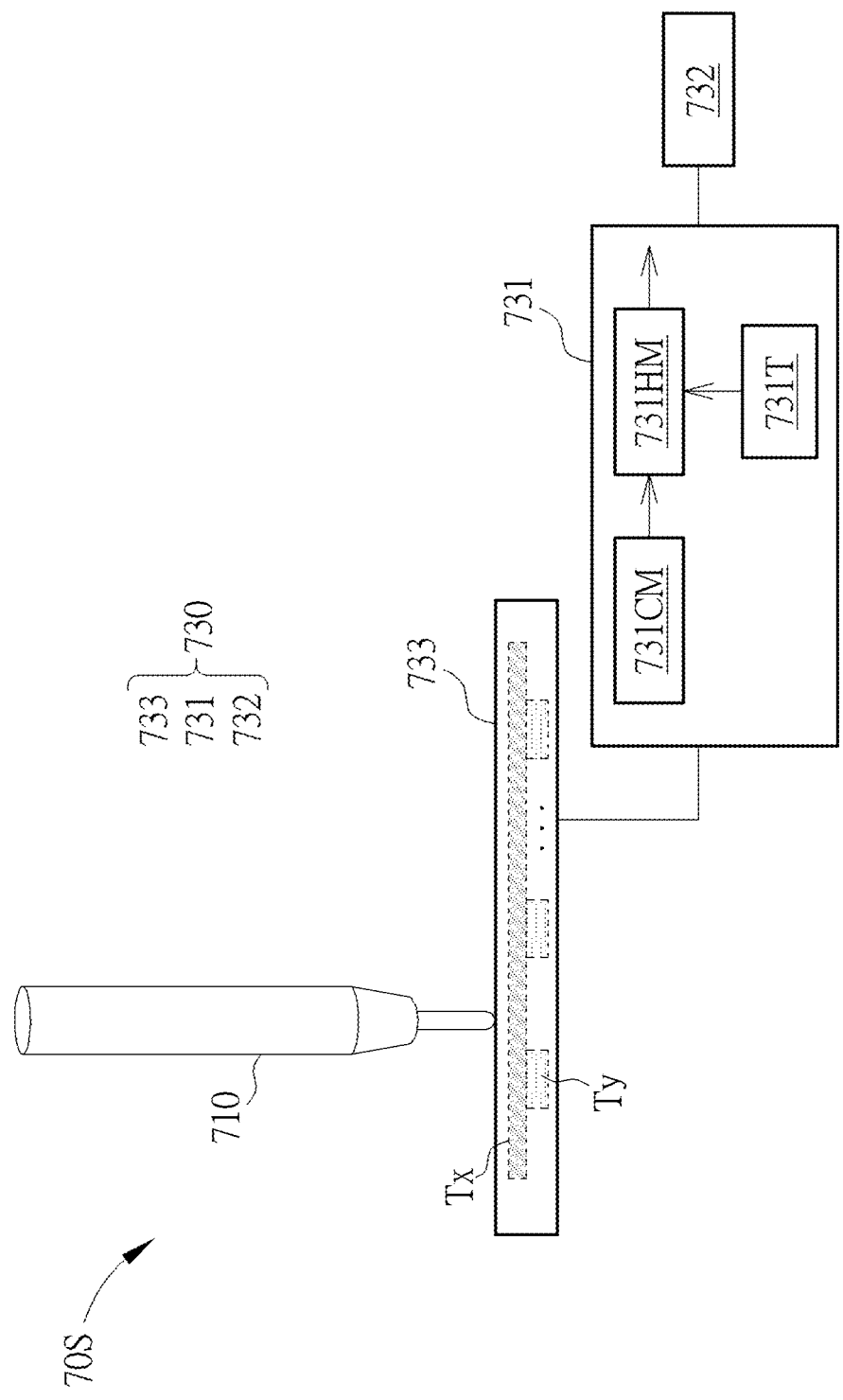
FIG. 7 to FIG. 9 are schematic diagrams of sensing systems according to embodiments of the present invention.

Therefore, the strength of the sensing signal, which is corresponding to the active stylus, may be used not only to determine whether the active stylus contacts the touch device, but also to determine the height of the active stylus relative to the touch device. For example, FIG. 7 is a schematic diagram of a sensing system 70S according to an embodiment of the present invention. A touch device 730 of the sensing system 70S may comprise a TDDI circuit 731, an application processor 732, and a touch panel 733. The TDDI circuit 731 may comprise a converting unit 731CM, a height lookup table 731T, and a height unit 731HM.

In one embodiment, the height lookup table 731T may provide a correspondence between a threshold value (e.g., S0, S1, S2, or S3) and a height (e.g., H0, H1, H2, or H3). By using the characteristic that the signal level or the strength of the sensing signal increase with the decreasing distance between the active stylus 710 and the touch device 730, the height lookup table 731T may be established. For example, to decide a threshold value (e.g., S0), first, a value may be determined by measuring signal levels of the active stylus 710 at a specific height (e.g., H0) but at different positions (i.e., different x and y coordinates), such that the signal levels fall between 95% and 105% of the value, which is then set in the height lookup table 731T to serve as the threshold value. The height lookup table 731T may be stored in a storage circuit of the touch device 730 or the TDDI circuit 731. The height lookup table 731T may comprise information listed in Table 1, for example. The height H0 in Table 1 may be 0 millimeters (mm). In other words, the threshold value S0 may correspond to the signal level when the active stylus 710 is in contact with the touch device 730.

TABLE 1

| | |
|---|---|
| S0 | H0 |
| S1 | H1 |
| S2 | H2 |
| S3 | H3 |

According to the height lookup table 731T, the height unit 731HM may convert the signal level, output by the converting unit 731CM, into the height of the active stylus 710 relative to the touch device 730. For example, after the converting unit 731CM converts/normalizes the sensing signal, corresponding to the active stylus 710, into a signal level (e.g., S0a), the height unit 731HM may compare the signal level (S0a) with the threshold value (e.g., S0, S1, S2, or S3) in the height lookup table 731T. When the height unit 731HM determines that the signal level (e.g., S0a) falls between 95% and 105% of a certain threshold value (e.g., S0), the height unit 731HM may determine the height of the active stylus 710 relative to the touch device 730, according to the height (e.g., H0), which is corresponding to the threshold value (e.g., S0), in the height lookup table 731T. When the height unit 731HM determines that the signal level is not between 95% and 105% of a certain threshold value, the height unit 731HM may find two threshold values (e.g., S0 and S1) closest to the signal level. Besides, based on the heights (e.g., H0, H1) corresponding to the two closest threshold values (e.g., S0, S1) in the height lookup table 731T, the height unit 731HM may use, for example, interpolation to calculate the height of the active stylus 710 relative to the touch device 730.

In another embodiment, the height lookup table 731T may provide a correspondence between a signal level and a height. Based on the height lookup table 731T, the height unit 731HM may directly convert the signal level, output by the converting unit 731CM, into the height of the active stylus relative to the touch device 730.

In one embodiment, according to the height of the active stylus 710, the touch device 730 (e.g., the TDDI circuit 731 or other components) may determine whether the sensing system 70S operates in touch mode or hover mode. Alternatively, the touch device 730 may provide other functions according to the height of the active stylus 710. Alternatively, the touch device 730 may output the height of the active stylus 710. The touch mode means that the active stylus 210 directly contacts the touch device 730; the hover mode means that the active stylus 210 does not directly contact the touch device 730.

Figure 8:
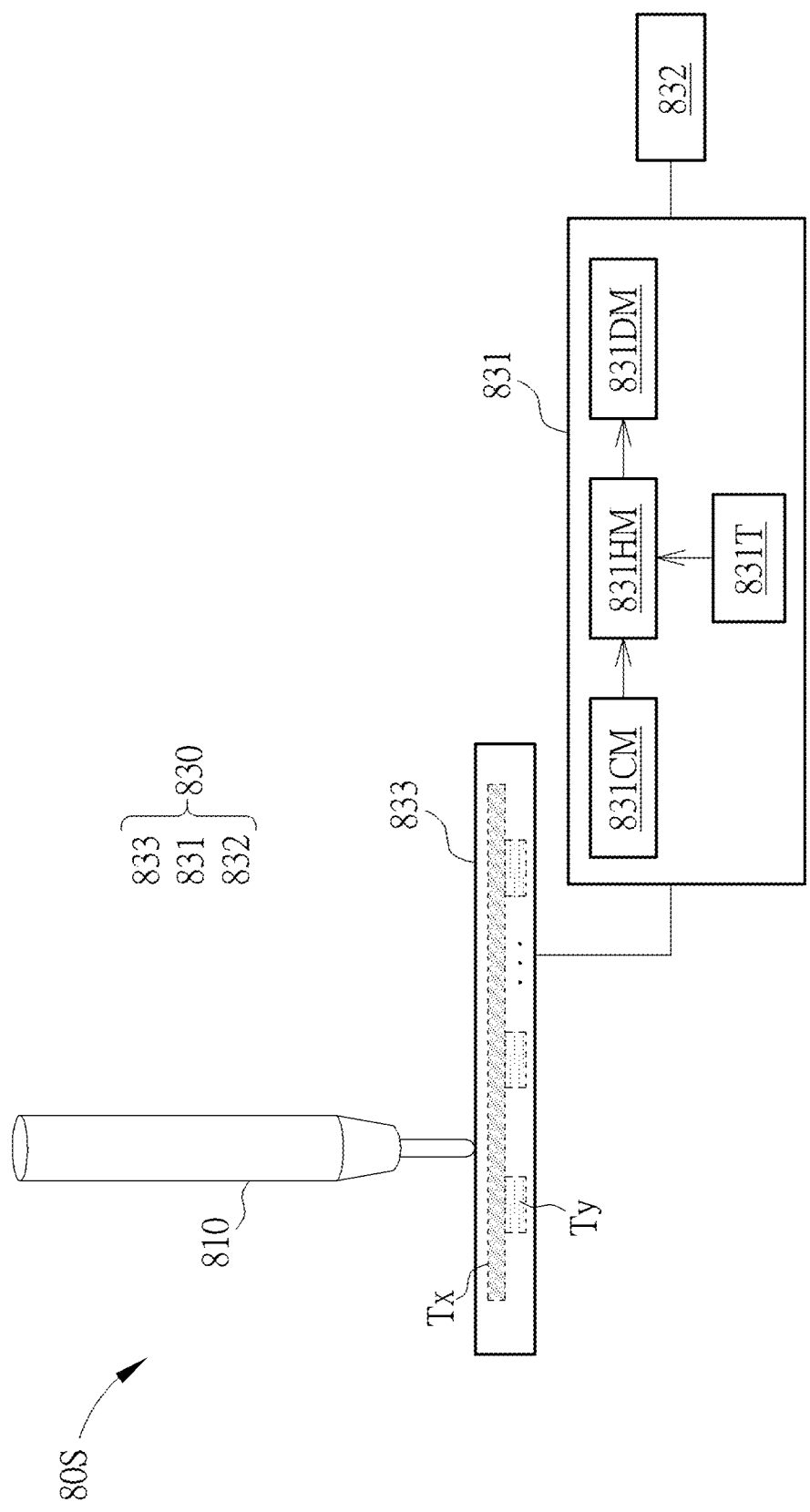

The height of the active stylus relative to the touch device may also be used to determine whether the active stylus contacts the touch device. For example, FIG. 8 is a schematic diagram of a sensing system 80S according to an embodiment of the present invention. A touch device 830 of the sensing system 80S may comprise a TDDI circuit 831, an application processor 832, and a touch panel 833. The TDDI circuit 831 may comprise a converting unit 831CM, a determining unit 831DM, a height lookup table 831T, and a height unit 831HM. The determining unit 831DM may determine whether the active stylus 810 contacts the touch device 830 according to the height of the active stylus 810 (e.g., by comparing whether the height is equal to the height H0 of the height lookup table 831T).

Correspondingly, a detection method, which may be compiled into a program code and used in a touch device (e.g., 830), may comprise the following steps:

Step S802: The sensor electrode(s) (e.g., Ty or Tx) detect(s) sensing signal(s). If the sensor electrode(s) detects a sensing signal corresponding to an active stylus (e.g., 810), proceed to step S804; otherwise, repeat step S802.

Step S804: A TDDI circuit (e.g., 831) converts the strength of the sensing signal into a signal level. Next, proceed to step S807.

Step S807: According to a height lookup table (e.g., 831T), the TDDI circuit converts the signal level into the height of the active stylus relative to the touch device. Next, proceed to step S808.

Step S808: Based on the height of the active stylus, the TDDI circuit determines whether the active stylus is in contact with the touch device. If yes, proceed to step S810; otherwise, proceed to step S814.

Step S810: Based on the determined result that the active stylus contacts the touch device, the TDDI circuit or application processor (e.g., 832) provides position information of the active stylus. Next, proceed to step S812.

Step S812: The touch panel (e.g., 833) displays an image for the active stylus operation corresponding to the position information.

Step S814: Based on the determined result that the active stylus is not in contact with the touch device, the TDDI circuit or the application processor does not provide position information of the active stylus. Next, proceed to step S816.

Step S816: The touch panel displays an image unrelated to the operation of the active stylus.

Specifically, please refer to FIGS. 8 and 6. Based on the strength of the sensing signal detected by the sensor electrode(s) Ty or Tx in step S802, the TDDI circuit 831 may obtain energy distribution data of the sensing signal relative to the sensor electrode(s) Ty or Tx in step S804. Then, the converting unit 831CM may convert the energy distribution data (e.g., D0a or D3e) into signal level(s) (e.g., S0a or S3e) in step S804. Then, according to the height lookup table 831T, in step S807, the height unit 831HM may convert the signal level (e.g., S0a or S3e), which is output by the converting unit 831CM, into the height of the active stylus 810 relative to the touch device 830 (e.g., the height H0 or H3 in Table 1).

In step S808, based on the height of the active stylus 810, the determining unit 831DM determines whether the active stylus 810 contacts the touch device 830. For example, in step S808, the TDDI circuit 831 may determine that the active stylus 810 is in contact with the touch device 830 if the height (e.g., 0, 0.05 or 0.1 millimeters), which is determined by the height unit 831HM, is equal to the height H0 (e.g., 0 millimeters) of the height lookup table 831T or is less than or equal to a height threshold (e.g., 0.1 millimeters). Then, the TDDI circuit 831 may, in step S810, point-report to the application processor 832, such that the position information or the sensing signal is transmitted to the application processor 832. In step S812, according to the position information of the active stylus 810, the application processor 832 may instruct the touch panel 833 to display the writing trajectory of the active stylus 810 or the corresponding operation result.

If, in step S808, the TDDI circuit 831, based on the height (e.g., 3 millimeters), determined by the height unit 831HM, being not equal to the height H0 of the height lookup table 831T or being greater than the height threshold, determines that the active stylus 810 is not in contact with the touch device 830, the TDDI circuit 831, in step S814, does not point-report to the application processor 832. Correspondingly, in step S816, the touch panel 833 does not display the writing trajectory of the active stylus 810 or corresponding operation results.

Figure 9:
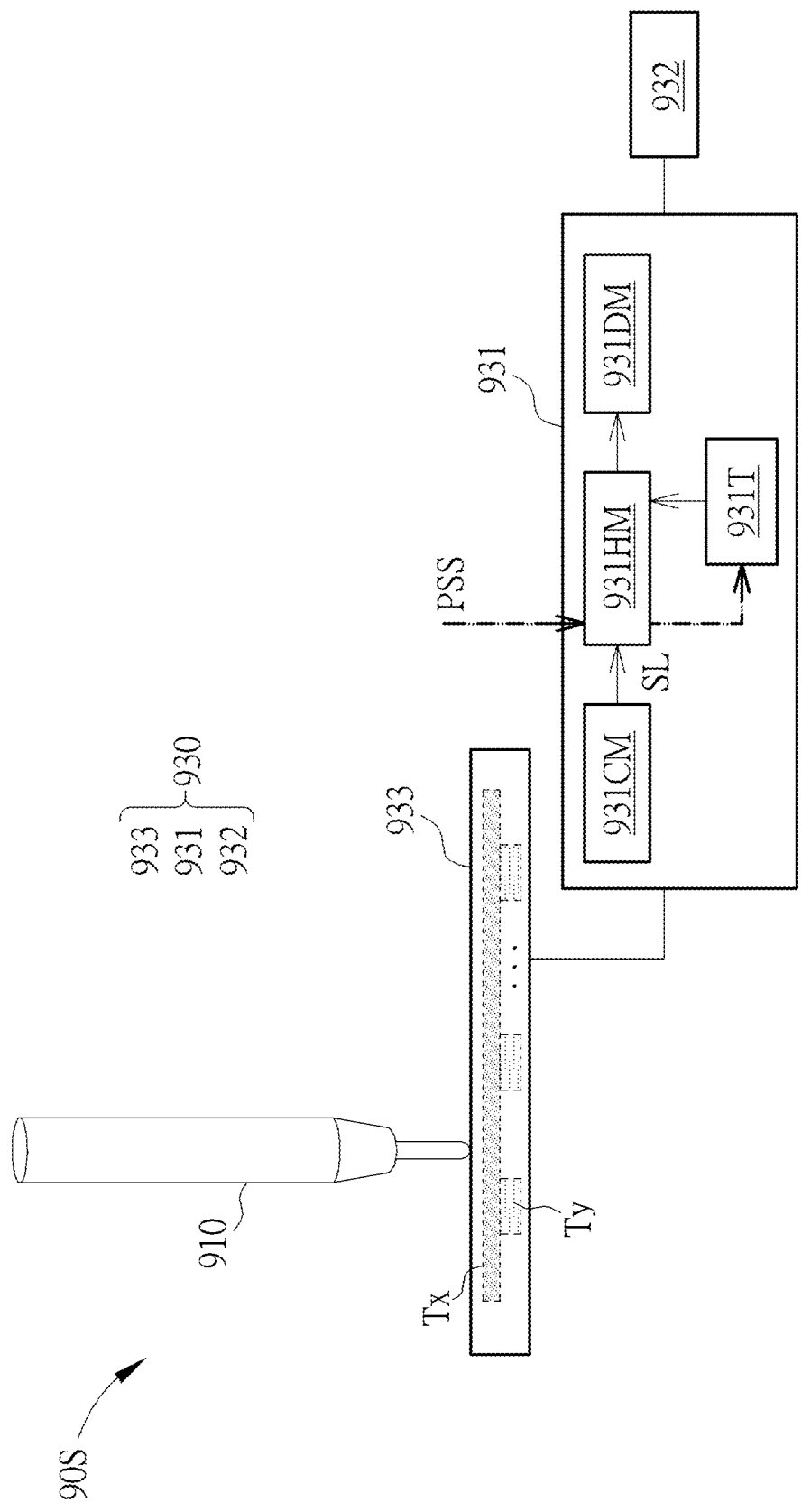

In one embodiment, the height lookup table may be preset during the manufacturing of the TDDI circuit and will not be updated. In another embodiment, to respond to environment changes, the conversion performed by the height unit (e.g., 831HM) may be adaptively adjusted (e.g., by updating the height lookup table 831T), thereby improving the accuracy of determining the height of the active stylus relative to the touch device. For example, FIG. 9 is a schematic diagram of a sensing system 90S according to an embodiment of the present invention. A touch device 930 of the sensing system 90S may comprise a TDDI circuit 931, an application processor 932, and a touch panel 933. The TDDI circuit 931 may comprise a converting unit 931CM, a determining unit 931DM, a height lookup table 931T, and a height unit 931HM.

The height unit 931HM may obtain a pressure sensing signal PSS, which is about a pressure sensing value of the active stylus 910, (from a pressure sensor of the active stylus 910), and determine whether it is necessary to instruct the update of the height lookup table 931T accordingly. For example, when the pressure sensing signal PSS is greater than or equal to a (first) update threshold (e.g., when the active stylus 910 is pressed against the touch device 930 or the pressure sensing value of the active stylus 910 is greater than or equal to a pressure threshold), the height unit 931HM may instruct to update the height lookup table 931T. When the pressure sensing signal PSS is less than the (first) update threshold (e.g., when the active stylus 910 simply lightly touches the touch device 930 or the pressure sensing value of the active stylus 910 is less than the pressure threshold), the height unit 931HM does not instruct to update the height lookup table 931T. After the correspondence between the height(s) and the threshold value(s) (or the signal level(s)) of the height lookup table 931T is adjusted or updated, the height unit 931HM may, according to the updated height lookup table 931T, convert the signal level into the height of the active stylus 910 relative to the touch device 930.

To correctly determine the height, the height unit 931HM may update all the threshold values (e.g., S0-S3) corresponding to heights (e.g., H0-H3). To improve efficiency or reduce costs, the height unit 931HM may update only a portion of the threshold values, which is/are corresponding to certain height(s). For example, the height unit 931HM only updates the threshold value S0 corresponding to the height H0 (e.g., 0 millimeters), to effectively determine whether the active stylus contacts the touch device 930.

Correspondingly, a detection method, which may be compiled into a program code and used in a touch device (e.g., 930), may comprise the following steps:

Step S902: The sensor electrode(s) (e.g., Ty or Tx) detect(s) sensing signal(s). If the sensor electrode(s) detect (s) a sensing signal corresponding to an active stylus (e.g., 910), proceed to step S904; otherwise, repeat step S902.

Step S904: A TDDI circuit (e.g., 931) converts the strength of the sensing signal into a signal level. Next, proceed to step S905.

Step S905: Based on a pressure sensing signal (e.g., PSS), the TDDI circuit determines whether it is necessary to update a height lookup table (e.g., 931T). If it is determined that the height lookup table needs to be updated, proceed to step S906; otherwise, proceed to step S907.

Step S906: The TDDI circuit updates at least one threshold value of the height lookup table (e.g., the threshold value S0 of the height lookup table 931T). Next, proceed to step S908.

Step S908: The TDDI circuit compares the threshold value with the signal level corresponding to the active stylus to determine whether the active stylus is in contact with the touch device. If yes, proceed to step S910; otherwise, proceed to step S914.

Step S910: Based on the determined result that the active stylus contacts the touch device, the TDDI circuit or application processor (e.g., 932) provides position information of the active stylus. Next, proceed to step S912.

Step S912: The touch panel (e.g., 933) displays an image for the active stylus operation corresponding to the position information.

Step S914: Based on the determined result that the active stylus is not in contact with the touch device, the TDDI circuit or the application processor does not provide position information of the active stylus. Next, proceed to step S916.

Step S916: The touch panel displays an image unrelated to the operation of the active stylus.

Figure 10:
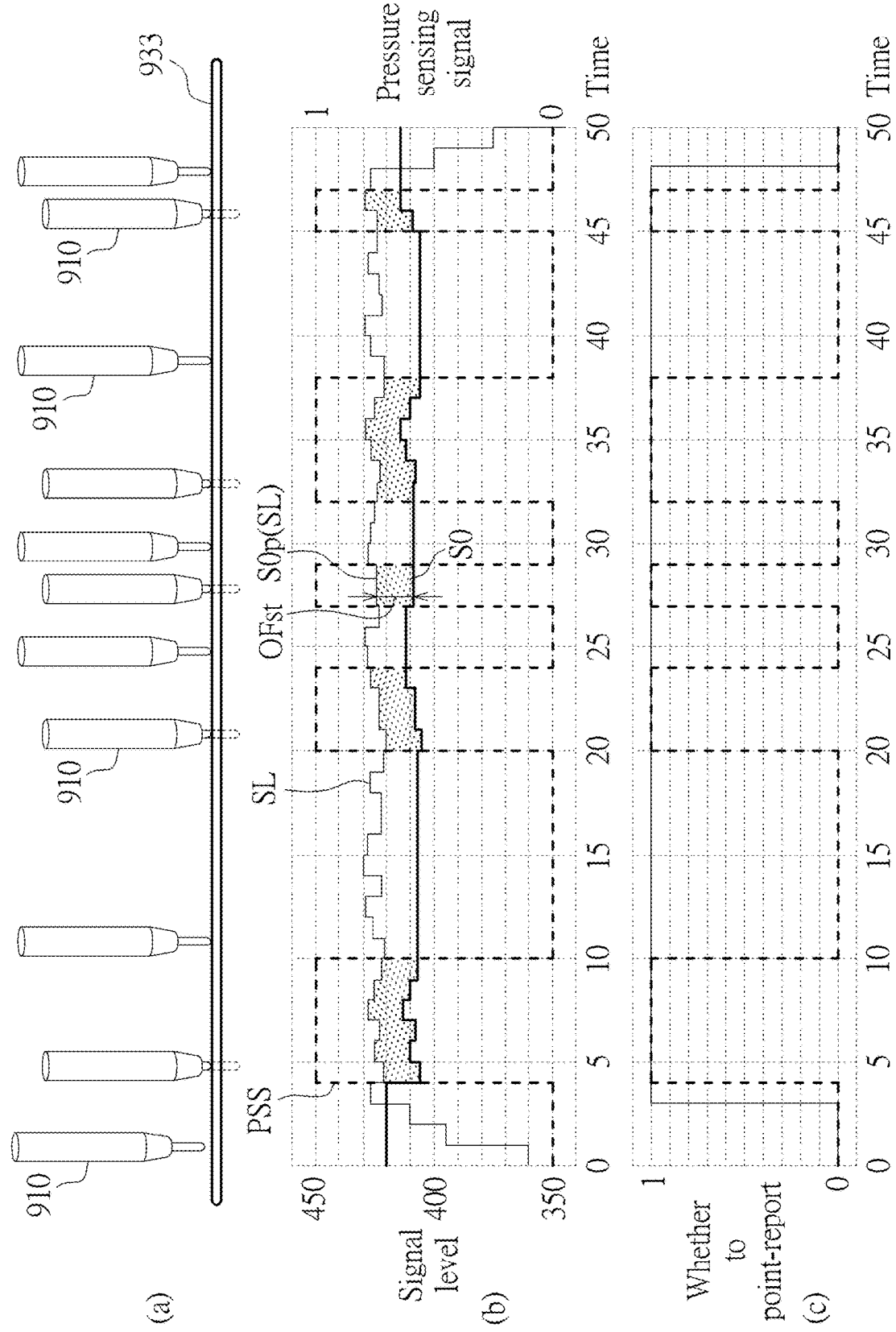
FIG. 10 is a schematic diagram of signals according to an embodiment of the present invention.

Specifically, please refer to FIGS. 9 and 10. FIG. 10 is a schematic diagram of signals according to an embodiment of the present invention. When or after the TDDI circuit 931 converts the strength of the sensing signal corresponding to the active stylus 910 into the signal level SL in step S904, the height unit 931HM, based on the pressure sensing signal PSS, may determine whether the height lookup table 931T needs to be updated in step S905. For example, when the pressure sensing signal PSS, shown as a bold dashed line in FIG. 10 (b), (at a time instant 4) is greater than or equal to the (first) update threshold (e.g., 1), which indicates that the active stylus 910 is in pressed state, the height unit 931HM may determine that an instruction of update is needed. When the pressure sensing signal PSS, shown as the bold dashed line in FIG. 10 (*b*), (at a time instant 15) is less than the (first) update threshold, the height unit 931HM may determine not to instruct an update.

If the TDDI circuit 931, in step S905, determines that the height lookup table 931T needs to be updated, since the active stylus 910 should be in contact with the touch device 930 at this time, the height unit 931HM may, based at least on the signal level at that time, update a threshold value (e.g., the threshold value S0 in the height lookup table 931T) in step S906. For example, the update of the threshold value S0 may satisfy S0=S0p−OFst, where S0p represents the signal level when the pressure sensing signal PSS is greater than or equal to the (first) update threshold, and OFst represents a signal level offset. For example, as shown in FIG. 10 (*b*), when the pressure sensing signal PSS, shown as the bold dashed line, (at the time instant 15) is equal to 0, the threshold value S0, shown as a bold solid line, remains unchanged. When the pressure sensing signal PSS, shown as the bold dashed line, (at the time instant 4) is equal to 1, the threshold value S0, shown as the bold solid line, changes or is updated. The difference between the threshold value S0 and the current signal level SL (i.e., the signal level S0p) is the signal level offset OFst. In other words, when the pressure sensing signal PSS is greater than or equal to the (first) update threshold, the signal level SL (i.e., the signal level S0p) may serve as a reference. Besides, this signal level SL deducting the signal level offset OFst may be updated to serve as the new threshold value S0, thereby being adaptable to environment changes.

Next, the determining unit 931DM may compare the threshold value S0 with the signal level SL corresponding to the active stylus 910 in step S908 to determine whether the active stylus 910 contacts the touch device 930. For example, as shown in FIG. 10 (*b*) (e.g., at a time instant 1), the TDDI circuit 931 may determine that the signal level SL, shown as a thin solid line, is less than the threshold value S0, shown as the bold solid line, and thus determine that the active stylus 910 is not in contact with the touch device 930. Therefore, as shown by the thin solid line in FIG. 10 (*c*) (e.g., at the time instant 1), in step S914, the TDDI circuit 931 does not point-report to the application processor 932.

On the other hand, as shown in FIG. 10 (*b*) (e.g., at the time instant 15), the TDDI circuit 931 may determine that the signal level SL, shown as the thin solid line, is greater than or equal to the threshold value S0, shown as the bold solid line, and thus determine that the active stylus 910 contacts the touch device 930 (or the height is 0 millimeters). As shown by the thin solid line in FIG. 10 (*c*) (e.g., at the time instant 15), the TDDI circuit 931 may, in step S910, point-report to the application processor 932, such that the touch panel 133 may display the writing trajectory of the active stylus 910 or the corresponding operation result in step S912, based on the position information of the active stylus 910.

In contrast, the bold dashed line in FIG. 10 (*c*) illustrates the operation between the active stylus 110 and the touch device 130 of the sensing system 10. The TDDI circuit 131 only point-reports to the application processor 132 when the pressure sensing value of the active stylus 110 is greater than or equal to the pressure threshold (e.g., at a time instant 5). When the pressure sensing value of the active stylus 110 is less than the pressure threshold (e.g., at the time instant 15), the bold dashed line in FIG. 10 (*c*) shows that the TDDI circuit 131 does not point-report to the application processor 132, while the thin solid line in FIG. 10 (*c*) shows that the TDDI circuit 931 does point-report to the application processor 932. In other words, the active stylus 910 and the touch device 930 of the sensing system 90S (e.g., between time instants 10 and 20) can avoid disconnection/discontinuity issues.

In one embodiment, the signal level offset OFst may be a constant value, and may be related to the fluctuation range of the signal level when the relative relationship/position between the active stylus 910 and the touch device 930 remains unchanged (i.e., the x, y, z coordinates remaining the same). For example, when the relative relationship/position between the active stylus 910 and the touch device 930 remains unchanged, the signal level may fluctuate between 95 and 105, and the signal level offset OFst may be equal to 10.

Figure 11:
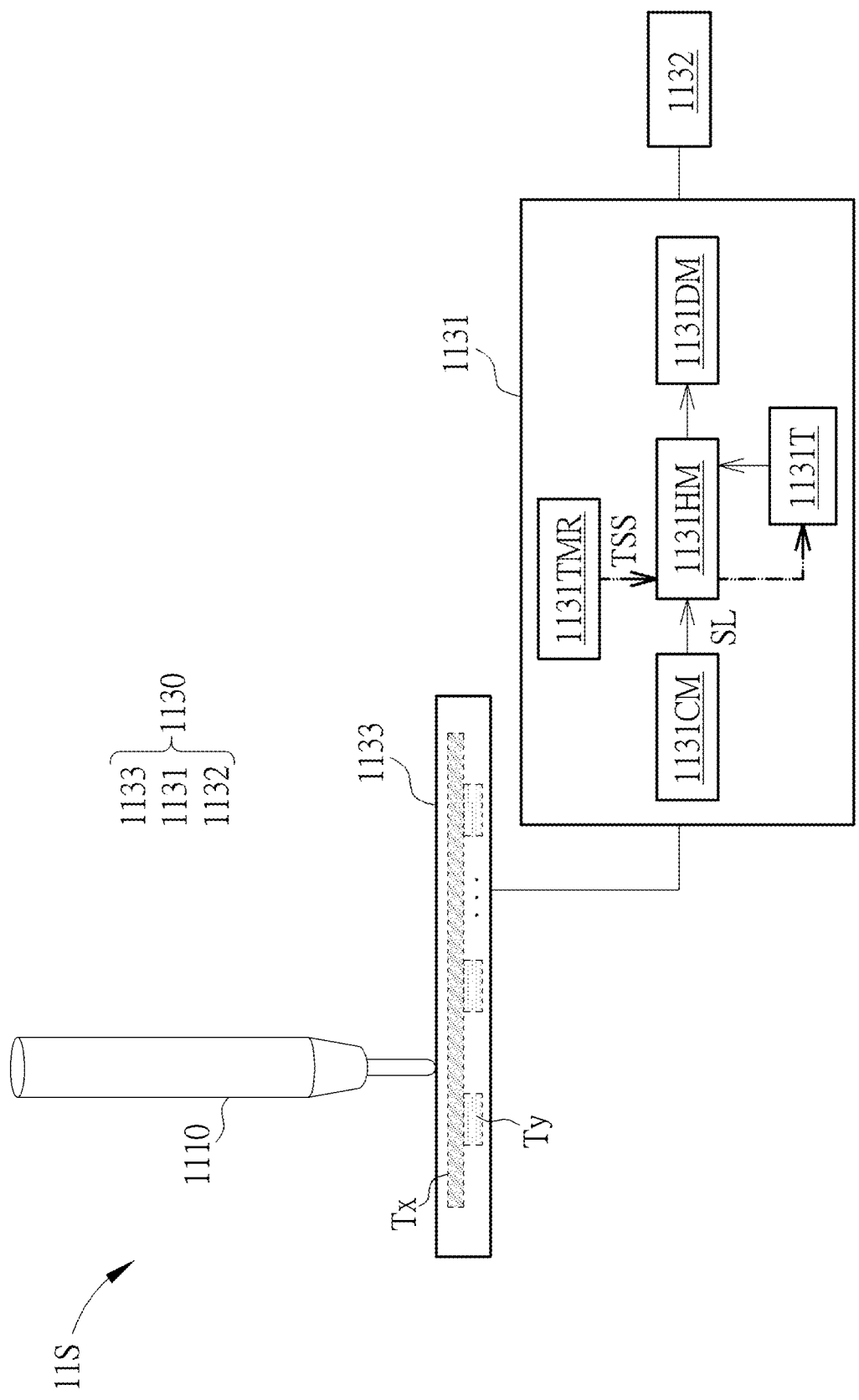
FIG. 11 is a schematic diagram of a sensing system according to an embodiment of the present invention.

In FIG. 9, the height lookup table 931T may be updated in response to a pressure sensing value, which is measured by the pressure sensor of the active stylus. In another embodiment, the height lookup table may be updated in response to a timer. For example, FIG. 11 is a schematic diagram of a sensing system 11S according to an embodiment of the present invention. A touch device 1130 of the sensing system 11S may comprise a TDDI circuit 1131, an application processor 1132, and a touch panel 1133. The TDDI circuit 1131 may comprise a timer 1131TMR, a converting unit 1131CM, a determining unit 1131DM, a height lookup table 1131T, and a height unit 1131HM. The timer 1131TMR is configured to provide a trigger signal TSS. The height unit 1131HM may obtain the trigger signal TSS, and determine whether it is necessary to instruct an update of the height lookup table 1131T accordingly.

Correspondingly, a detection method, which may be compiled into a program code and used in a touch device (e.g., 1130), may comprise the following steps:

Step S1102: The sensor electrode(s) (e.g., Ty or Tx) detect(s) sensing signal(s). If the sensor electrode(s) detect(s) a sensing signal corresponding to an active stylus (e.g., 1110), proceed to step S1104; otherwise, repeat step S1102.

Step S1104: A TDDI circuit (e.g., 1131) converts the strength of the sensing signal into a signal level. Next, proceed to step S1105.

Step S1105: Based on a trigger signal (e.g., TSS) of a timer (e.g., 1131TMR), the TDDI circuit determines whether it is necessary to update a height lookup table (e.g., 1131T). If it is determined that the height lookup table needs to be updated, proceed to step S1106; otherwise, proceed to step S1107.

Step S1106: The TDDI circuit updates at least one threshold value of the height lookup table (e.g., the threshold value S0 of the height lookup table 1131T). Next, proceed to step S1108.

Step S1108: The TDDI circuit compares the threshold value with the signal level corresponding to the active stylus to determine whether the active stylus is in contact with the touch device. If yes, proceed to step S1110; otherwise, proceed to step S1114.

Step S1110: Based on the determined result that the active stylus contacts the touch device, the TDDI circuit or the application processor (e.g., 1132) provides position information of the active stylus. Next, proceed to step S1112.

Step S1112: The touch panel (e.g., 1133) displays an image for the active stylus operation corresponding to the position information.

Step S1114: Based on the determined result that the active stylus is not in contact with the touch device, the TDDI circuit or the application processor does not provide position information of the active stylus. Next, proceed to step S1116.

Step S1116: The touch panel displays an image unrelated to the operation of the active stylus.

Figure 12:
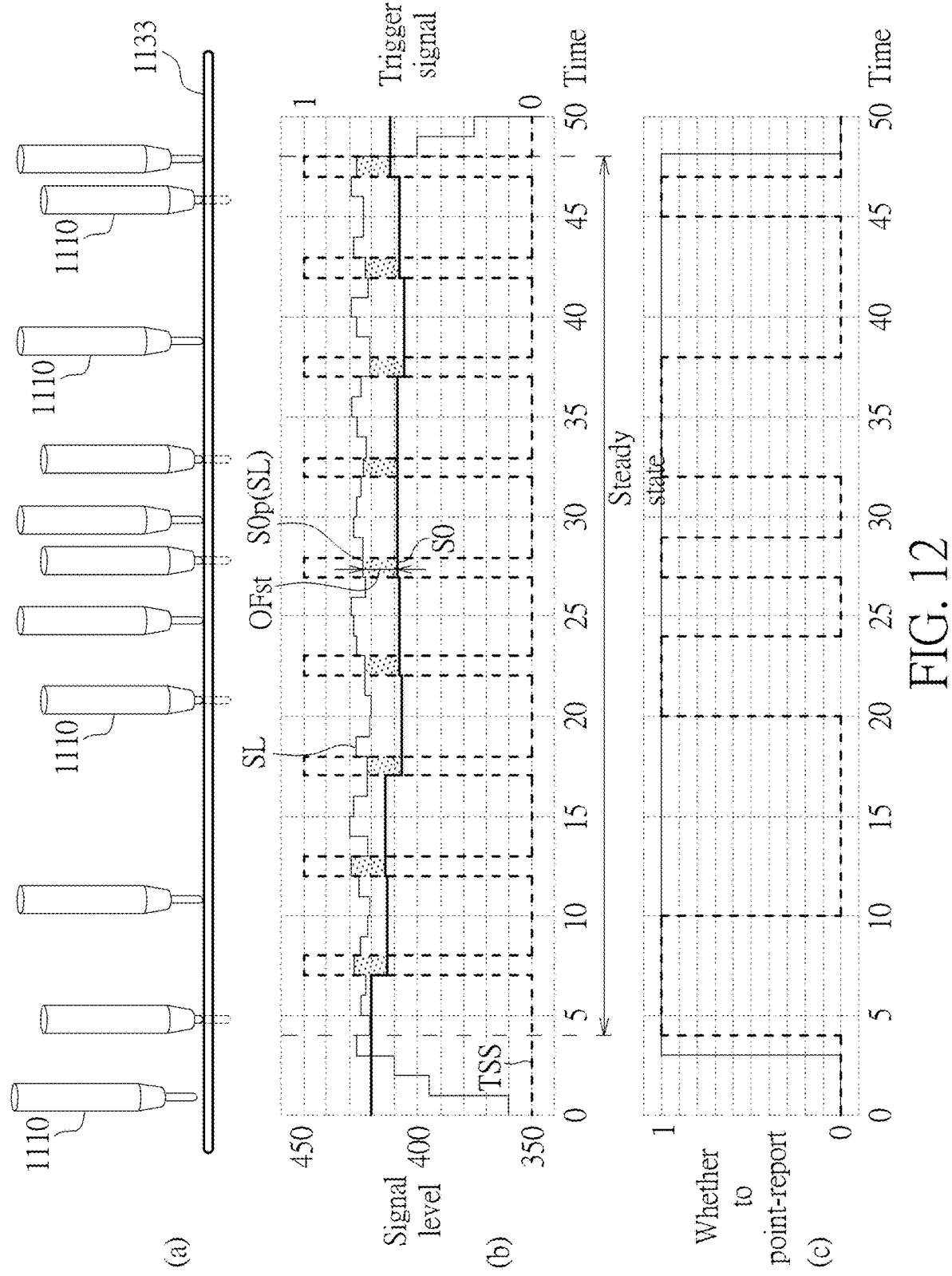
FIG. 12 and FIG. 13 are schematic diagrams of signals according to embodiments of the present invention.

Specifically, please refer to FIGS. 11 and 12. FIG. 12 is a schematic diagram of signals according to an embodiment of the present invention. When or after the TDDI circuit 1131 converts the strength of the sensing signal corresponding to the active stylus 1110 into the signal level SL in step S1104, the height unit 1131HM, based on the trigger signal TSS, may determine whether the height lookup table 1131T needs to be updated in step S1105. For example, when the trigger signal TSS, shown as a bold dashed line in FIG. 12 (b), (at a time instant 7) is greater than or equal to a (second) update threshold (e.g., 1), the height unit 1131HM may determine that an instruction of update is required. When the trigger signal TSS, shown as the bold dashed line in FIG. 12 (b), (at a time instant 15) is less than the (second) update threshold, the height unit 1131HM may determine that there is no need to instruct an update.

If the TDDI circuit 1131, in step S1105, determines that the height lookup table 1131T needs to be updated, the height unit 1131HM may, based at least on the signal level at the time, update a threshold value (e.g., the threshold value S0 of the height lookup table 1131T) in step S1106. For example, the update of the threshold value S0 may satisfy S0=S0p−OFst, where S0p represents the signal level when the trigger signal TSS is greater than or equal to the (second) update threshold, and OFst represents a signal level offset. For example, as shown in FIG. 12 (b), when the trigger signal TSS, shown as the bold dashed line, (at the time instant 15) is equal to 0, the threshold value S0, shown as a bold solid line, remains unchanged. When the trigger signal TSS, shown as the bold dashed line, (at the time instant 7) is equal to 1, the threshold value S0, shown as the bold solid line, changes or is updated. The difference between the threshold value S0 and the current signal level SL (i.e., the signal level S0p) is the signal level offset OFst. In other words, when the trigger signal TSS is greater than or equal to the (second) update threshold, the signal level SL (i.e., the signal level S0p) may serve as a reference. Besides, this signal level SL deducting the signal level offset OFst may be updated to serve as the new threshold value S0, thereby being adaptable to environment changes.

Next, the determining unit 1131DM may compare the threshold value S0 with the signal level SL corresponding to the active stylus 1110 in step S1108 to determine whether the active stylus 1110 contacts the touch device 1130. For example, as shown in FIG. 12 (b) (e.g., at a time instant 1), the TDDI circuit 1131 may determine that the signal level SL, shown as a thin solid line, is less than the threshold value S0, shown as the bold solid line, and hence determine that the active stylus 1110 is not in contact with the touch device 1130. Therefore, as shown by the thin solid line in FIG. 12 (c) (at the time instant 1), the TDDI circuit 1131 does not point-report to the application processor 1132 in step S1114.

On the other hand, as shown in FIG. 12 (b) (e.g., at the time instant 15), the TDDI circuit 1131 may determine that the signal level SL, shown as the thin solid line, is greater than or equal to the threshold value S0, shown as the bold solid line, and thus determine that the active stylus 1110 contacts the touch device 1130 (or the height is 0 millimeters). As shown by the thin solid line in FIG. 12 (c) (e.g., at the time instant 15), the TDDI circuit 1131 may, in step S1110, point-report to the application processor 1132, such that the touch panel 133 may display the writing trajectory of the active stylus 1110 or the corresponding operation results in step S1112, according to the position information of the active stylus 1110.

In contrast, the bold dashed line in FIG. 12 (c) illustrates the operation between the active stylus 110 and the touch device 130 of the sensing system 10. The TDDI circuit 131 only point-reports to the application processor 132 when the pressure sensing value of the active stylus 110 is greater than or equal to the pressure threshold (e.g., at a time instant 5). When the pressure sensing value of the active stylus 110 is less than the pressure threshold (e.g., at the time instant 15), the bold dashed line in FIG. 12 (c) shows that the TDDI circuit 131 does not point-report to the application processor 132, while the thin solid line in FIG. 12 (c) shows that the TDDI circuit 1131 does point-report to the application processor 1132. In other words, the active stylus 1110 and the touch device 1130 of the sensing system 11S (e.g., between time instants 10 and 20) may avoid disconnection/discontinuity issues.

It is worth noting that the time instant of the trigger signal TSS being greater than or equal to the (second) update threshold (e.g., a time instant 12) may be different from the time instant of the pressure sensing value of the active stylus 110 being greater than or equal to the pressure threshold (e.g., a time instant 10). The timer 1131TMR may periodically or regularly cause the trigger signal TSS to be greater than or equal to the (second) update threshold, such that the height lookup table 1131T or the threshold value S0 is updated periodically or regularly. Alternatively, the timer 1131TMR may cause the trigger signal TSS to be greater than or equal to the (second) update threshold after the signal level SL has entered a steady state for a while (e.g., at the time instant 7 or 12 shown in FIG. 12 (b)) (or when the signal level SL enters the steady state). Accordingly, the height lookup table 1131T or the threshold value S0 is updated after the signal level SL has entered the steady state for a while (or when the signal level SL enters the). The steady state means that the fluctuation amplitude of a signal (e.g., signal level SL) is less than a certain range. When the active stylus 1110 remains in contact with the touch device 1130 or when the active stylus 1110 slides on a surface (e.g., on the touch device 1130), the normalized signal level SL may be equal to or close to a certain value, and thus enter a steady state. Before the height lookup table 1131T is updated, the threshold value S0 may be set to a default value (e.g., 420 shown in FIG. 12 (b)).

Updating the height lookup table (e.g., 931T or 1131T) helps the touch device (e.g., 930 or 1130) respond to environment changes. For example, when a screen protector is attached to a touch panel (e.g., 933 or 1133), the overall thickness of the touch device increases. As a result, the strength of the sensing signal corresponding to the active stylus (e.g., 910 or 1110) in contact with the screen protector on the touch panel may differ from the strength of the sensing signal corresponding to the active stylus in (direct) contact with the touch panel. Therefore, the touch device must adjust a reference value for judgment (e.g., the threshold value S0 in the height lookup table 931T or 1131T, or the threshold values S0, S1, S2, S3 in the height lookup table 731T) to correctly determine whether the active stylus is in contact with the touch device before and after a screen protector is added. If the touch device does not adjust the reference value, after the screen protector is attached on the touch device, the touch device may not determine that the active stylus is in contact with the touch device (even if the active stylus actually touches the screen protector on the touch panel). It is because the height of the active stylus relative to the touch panel increases after the screen protector is attached on the touch device.

Figure 13:
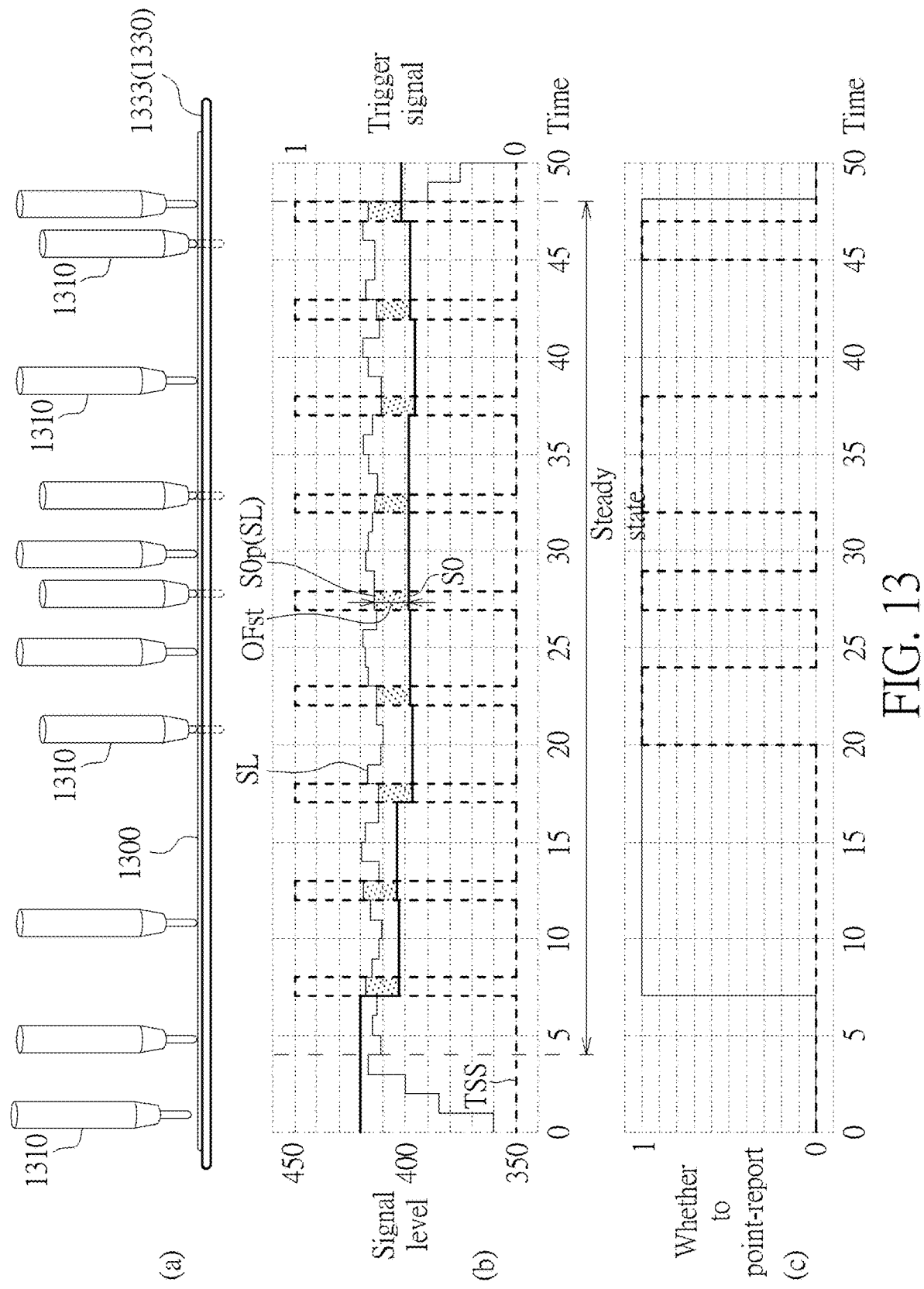

For example, FIG. 13 is a schematic diagram of signals according to an embodiment of the present invention. When a screen protector 1300 is attached to a touch panel 1333 and becomes part of the touch device 1330, the signal level SL, which is corresponding to an active stylus 1310 initially in contact with the touch panel 1333 (e.g., at a time instant 5 in FIG. 12 (b)), may be lower than the threshold value S0 in the height lookup table (e.g., 1131T). However, the present invention may correct the threshold value S0. For example, a timer (e.g., 1131TMR) may cause the trigger signal TSS to be greater than or equal to the (second) update threshold after the signal level SL has entered a steady state for a while (e.g., at the time instant 7 or 12 in FIG. 12 (b)), such that the threshold value S0 of the height lookup table is updated and drops after the signal level SL has entered the steady state for a while. Accordingly, the updated threshold value S0 may be used to correctly determine whether the active stylus 1310 contacts the screen protector 1300 of the touch device 1330.

In one embodiment, the touch device (e.g., 130-1330) may be, for example, a mobile phone or a tablet. The converting unit, the 2D-to-1D unit, the determining unit, or the height unit may be implemented using circuits. The touch device 230 may be implemented using one of the touch devices 330-1330. The TDDI circuit 231 may be implemented using one of the TDDI circuits 331-1131. The active styluses 210-1310 may be implemented using one of the active styluses 110 and 310.

In one embodiment, details or modifications for the structure of the active stylus (e.g., 110-1310) or the touch device (e.g., 130-1330), uplink signals, and downlink signals, are disclosed in U.S. patent application Ser. No. 17/671,621, the disclosure of which is hereby incorporated by reference herein in its entirety and made a part of this specification. For example, to transmit uplink signals and downlink signals, the active stylus may comprise a transceiver, and the touch device may comprise sensor electrodes. For example, the sensing signal, detected by the sensor electrode(s), may serve as a downlink signal, and the transmission timing of the downlink signal of the active stylus may be adjusted, according to U.S. patent application Ser. No. 17/671,621, to meet the timing requirements of the touch device.

In one embodiment, details or modifications for communication protocol, the structure of the active stylus (e.g., 110-1310) or the touch device (e.g., 130-1330), uplink signals, and downlink signals, are disclosed in U.S. patent application Ser. No. 17/693,403, the disclosure of which is hereby incorporated by reference herein in its entirety and made a part of this specification. For example, because the strength of the sensing signal, corresponding to the active stylus, may be different, height lookup tables (e.g., 831T-1131T) of the touch device (e.g., 830-1330) for different active styluses (e.g., 110-1310) may vary from one to another. Based on, for example, the communication protocol or the identity (ID) of the active stylus, the touch device of the present invention may determine or select the height lookup table to be used. For example, the touch device of the present invention may accurately determine whether the active stylus is in contact with or has left the touch device. Furthermore, according to U.S. patent application Ser. No. 17/693,403, the touch device may make its time sequence or its transmission frequency of uplink signals for different communication protocols dependent on whether the active stylus has just left or entered the detection range of the touch device. Therefore, an active stylus that has just left and is the first to touch/hover on the touch device again may be quickly detected by the touch device. For example, the touch device, as described in U.S. patent application Ser. No. 17/693,403, may support multitouch for different active styluses.

To sum up, to solve the issue of the incapability to accurately determine whether an active stylus is in contact with the touch device due to an insufficient pressure sensing value, the active stylus without a pressure sensor, or the active stylus without activating a pressure sensor, the present invention provides a sensing system capable of detecting the height of an active stylus without a contact sensor (e.g., a pressure sensor). Based on the strength of the sensing signal corresponding to the active stylus, the sensing system may, determine whether the active stylus is in contact with the touch device. Accordingly, the sensing system may also assist an active stylus equipped with a pressure sensor to solve the disconnection/discontinuity issues when the active stylus gently sliding continuously without pressure sensibility. Moreover, the sensing system also allows an active stylus without a pressure sensor or an active stylus without activating a pressure sensor to achieve continuous sliding and writing.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detection method, for a touch and display driver integration (TDDI) circuit of a touch device, comprising:
   determining whether an active stylus contacts the touch device according to information related to strength of a sensing signal, which is corresponding to the active stylus; and
   providing the sensing signal or position information of the active stylus after determining that the active stylus is in contact with the touch device,
   wherein the TDDI circuit determines whether the active stylus is in contact with the touch device, according to whether a signal level, which is derived after conversion according to the strength of the sensing signal, is greater than or equal to a threshold value;
   wherein the threshold value is updated when a pressure sensing value of the active stylus is greater than a pressure threshold, after the signal level enters a steady state, or periodically.

2. The detection method of claim 1,
   wherein the active stylus does not comprise any pressure sensor or does not activate any pressure sensor; or
   wherein the pressure sensing value sensed by a pressure sensor of the active stylus is less than the pressure threshold.

3. The detection method of claim 1, further comprising:
   not providing the sensing signal or the position information of the active stylus after determining that the active stylus does not contact the touch device.

4. The detection method of claim 1, wherein the step of determining whether the active stylus contacts the touch device according to the information related to the strength of the sensing signal comprises:
   performing normalization, corresponding to the strength of the sensing signal, to derive the signal level; and
   comparing the signal level with the threshold value to determine whether the active stylus contacts the touch device;
   wherein a plurality of signal levels comprising the signal level are derived after normalization corresponding to a plurality of sensing signals, which are corresponding to the active stylus at a same height but different positions, wherein the plurality of signal levels fall between 95% and 105% of a value, wherein the plurality of sensing signals comprises the sensing signal.

5. The detection method of claim 1, further comprising:
performing conversion, corresponding to the strength of the sensing signal, to derive a height of the active stylus relative to the touch device; and
determining, according to the height, whether the active stylus is operating in touch mode or hover mode.

6. The detection method of claim 1, wherein the TDDI circuit, according to a height lookup table performs conversion, corresponding to the strength of the sensing signal, to derive a height of the active stylus relative to the touch device.

7. The detection method of claim 1, wherein the step of determining whether the active stylus contacts the touch device according to the information related to the strength of the sensing signal comprises:
performing normalization, corresponding to the strength of the sensing signal, to derive the signal level; and
converting the signal level into a height of the active stylus relative to the touch device; and
determining, according to the height, whether the active stylus contacts the touch device;
wherein a plurality of signal levels comprising the signal level are derived after normalization corresponding to a plurality of sensing signals, which are corresponding to the active stylus at the same height but different positions, wherein the plurality of signal levels fall between 95% and 105% of a value, wherein the plurality of sensing signals comprises the sensing signal.

8. The detection method of claim 1,
wherein, corresponding to the strength of the signal level, the TDDI circuit performs conversion, according to a height lookup table, to derive a height of the active stylus relative to the touch device,
wherein the TDDI circuit updates the height lookup table when the pressure sensing value of the active stylus is greater than the pressure threshold, after the strength enters a first steady state, or periodically.

9. The detection method of claim 1, wherein the TDDI circuit is configured to determine whether the active stylus contacts the touch device, which comprises or does not comprise a screen protector.

10. The detection method of claim 1, wherein the step of determining whether the active stylus contacts the touch device according to the information related to the strength of the sensing signal comprises:
receiving a pressure sensing signal from a pressure sensor,
determining that the active stylus is in contact with the touch device, according to the pressure sensing value corresponding to the pressure sensing signal being less than the pressure threshold, and according to the strength of the sensing signal being greater than a strength threshold.

11. A touch and display driver integration (TDDI) circuit, which is or is to be disposed in a touch device, comprising:
a determining unit, to determine whether an active stylus contacts the touch device according to information related to strength of a sensing signal, which is corresponding to the active stylus; and
an output terminal, to provide the sensing signal or position information of the active stylus after determining that the active stylus is in contact with the touch device,
wherein the determining unit is configured to determine whether the active stylus is in contact with the touch device, according to whether a signal level, which is derived after conversion according to the strength of the sensing signal, is greater than or equal to a threshold value,
wherein the threshold value is updated when a pressure sensing value of the active stylus is greater than a pressure threshold, updated after the signal level enters a steady state, or updated periodically.

12. The TDDI circuit of claim 11,
wherein the active stylus does not comprise any pressure sensor or does not activate any pressure sensor, such that the TDDI circuit does not receive information related to the pressure sensing value of the active stylus; or
wherein the TDDI circuit receives information indicating that the pressure sensing value of the active stylus is less than the pressure threshold.

13. The TDDI circuit of claim 11, wherein after determining that the active stylus does not contact the touch device, the TDDI circuit does not provide the sensing signal or the position information of the active stylus.

14. The TDDI circuit of claim 11, further comprising:
a converting unit, to perform normalization, corresponding to the strength of the sensing signal, to derive the signal level,
wherein the determining unit compares the signal level with the threshold value to determine whether the active stylus contacts the touch device,
wherein a plurality of signal levels comprising the signal level are derived after normalization corresponding to a plurality of sensing signals, which are corresponding to the active stylus at a same height but different positions, wherein the plurality of sensing signals comprises the sensing signal,
wherein the plurality of signal levels fall between 95% and 105% of a value.

15. The TDDI circuit of claim 12, further comprising:
a height unit, to perform conversion, corresponding to the strength of the sensing signal, to derive a height of the active stylus relative to the touch device,
wherein the TDDI circuit, according to the height, determines whether the active stylus is operating in touch mode or hover mode.

16. The TDDI circuit of claim 11, wherein the TDDI circuit or the touch device comprises:
a storage circuit, to store a height lookup table,
wherein the TDDI circuit, according to the height lookup table, perform conversion, corresponding to the strength of the sensing signal, to derive a height of the active stylus relative to the touch device.

17. The TDDI circuit of claim 11, further comprising:
a converting unit, to perform normalization, corresponding to the strength of the sensing signal, to derive the signal level; and
a height unit, to convert the signal level into a height of the active stylus relative to the touch device, wherein the determining unit, according to the height, determines whether the active stylus contacts the touch device;
wherein a plurality of signal levels comprising the signal level are derived after normalization corresponding to a plurality of sensing signals, which are corresponding to the active stylus at the same height but different positions, wherein the plurality of signal levels fall between 95% and 105% of a value, wherein the plurality of sensing signals comprises the sensing signal.

18. The TDDI circuit of claim 11, further comprising:
a height unit, to, corresponding to the strength of the signal level, perform conversion, according to a height lookup table, to derive a height of the active stylus relative to the touch device,
wherein the height unit updates the height lookup table when the pressure sensing value of the active stylus is greater than the pressure threshold, after the strength enters a first steady state, or periodically.

19. The TDDI circuit of claim 11, wherein the TDDI circuit is configured to determine whether the active stylus contacts the touch device, which comprises or does not comprise a screen protector.

20. The TDDI circuit of claim 11,
wherein the TDDI circuit receives a pressure sensing signal from a pressure sensor,
wherein the determining unit determines that the active stylus is in contact with the touch device, according to the pressure sensing value corresponding to the pressure sensing signal being less than the pressure threshold, and according to the strength of the sensing signal being greater than a strength threshold.

* * * * *